United States Patent
Whyatt et al.

(10) Patent No.: US 10,622,653 B2
(45) Date of Patent: Apr. 14, 2020

(54) HIGH POWER DENSITY SOLID OXIDE FUEL CELL STEAM REFORMING SYSTEM AND PROCESS FOR ELECTRICAL GENERATION

(71) Applicant: Battelle Memorial Institute, Richland, WA (US)

(72) Inventors: Greg A. Whyatt, West Richland, WA (US); Lawrence A. Chick, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 0 days.

(21) Appl. No.: 14/210,228

(22) Filed: Mar. 13, 2014

(65) Prior Publication Data

US 2016/0190622 A1 Jun. 30, 2016

Related U.S. Application Data

(60) Provisional application No. 61/784,088, filed on Mar. 14, 2013.

(51) Int. Cl.
| | |
|---|---|
| H01M 8/04007 | (2016.01) |
| H01M 8/04014 | (2016.01) |
| H01M 8/04089 | (2016.01) |
| H01M 8/0612 | (2016.01) |
| H01M 8/1246 | (2016.01) |
| H01M 8/04111 | (2016.01) |
| H01M 8/0662 | (2016.01) |
| H01M 8/124 | (2016.01) |

(52) U.S. Cl.
CPC ..... *H01M 8/0618* (2013.01); *H01M 8/04097* (2013.01); *H01M 8/04111* (2013.01); *H01M 8/0662* (2013.01); *H01M 2008/1293* (2013.01)

(58) Field of Classification Search
None
See application file for complete search history.

(56) References Cited

U.S. PATENT DOCUMENTS

| | | | | |
|---|---|---|---|---|
| 5,573,867 | A * | 11/1996 | Zafred et al. | 429/410 |
| 6,017,646 | A | 1/2000 | Prasad et al. | |
| 2003/0143448 | A1* | 7/2003 | Keefer | B01D 53/047 429/9 |
| 2005/0158594 | A1* | 7/2005 | Ahmed | C01B 3/32 48/197 R |

(Continued)

FOREIGN PATENT DOCUMENTS

| | | |
|---|---|---|
| EP | 1 021 845 B1 | 7/2000 |
| EP | 1 252 674 B1 | 10/2002 |

(Continued)

OTHER PUBLICATIONS

Minh, Presented Paper: Solid Oxide Fuel Cell Hybrid System for Distributed Power Generation, presented at the second DOE/UN International Conference and Workshop on Hybrid Power Systems, Apr. 16-17, 2002.

(Continued)

*Primary Examiner* — Haroon S. Sheikh
(74) *Attorney, Agent, or Firm* — Klarquist Sparkman, LLP

(57) ABSTRACT

A system comprising:
a solid oxide fuel cell having an anode and a cathode;
an anode recycle loop; and
an adiabatic steam reformer positioned in the anode recycle loop.

11 Claims, 9 Drawing Sheets

(56) References Cited

U.S. PATENT DOCUMENTS

| | | | | |
|---|---|---|---|---|
| 2008/0038600 A1* | 2/2008 | Valensa | ............ | H01M 8/04022 |
| | | | | 429/423 |
| 2008/0107932 A1* | 5/2008 | Pham | ........................ | C01B 3/38 |
| | | | | 48/197 R |
| 2012/0251899 A1* | 10/2012 | Lehar | .................. | H01M 8/0612 |
| | | | | 429/410 |

FOREIGN PATENT DOCUMENTS

| | | |
|---|---|---|
| EP | 1 754 270 B1 | 2/2007 |
| EP | 1 902 954 A2 | 3/2008 |
| WO | WO 2004/032273 A2 | 4/2004 |
| WO | WO 2004/076017 A2 | 9/2004 |
| WO | WO 2008/063046 A1 | 5/2008 |

OTHER PUBLICATIONS

Whyatt et al., "Electrical Generation for More-Electric Aircraft Using Solid Oxide Fuel Cells," Prepared for the U.S. Department of Energy, PNNL-21382; Apr. 2012.

\* cited by examiner

HIGH POWER DENSITY SOLID OXIDE FUEL CELL STEAM REFORMING SYSTEM AND PROCESS FOR ELECTRICAL GENERATION

This application claims the benefit of U.S. provisional application 61/784,088, filed Mar. 14, 2013, which is incorporated herein by reference in its entirety.

BACKGROUND

Solid oxide fuel cell (SOFC) technology has the potential to generate electrical power at high efficiency. For example, SOFCs can generate electrical power at higher efficiency than is achieved by using power from a main engine shaft from an aircraft to run a generator. Hence, unlike the existing auxiliary power unit (APU) which is turned off once the main engines are started, a solid oxide fuel cell power unit (SOFCPU) would operate throughout the flight to maximize fuel savings. SOFCPU's are expected to be somewhat heavier than turbine APUs resulting in a heavier aircraft. A key hurdle to demonstrate the feasibility of a SOFCPU is to show that the increase in fuel consumption due to the increase in aircraft weight is less than the savings obtained by operation of the SOFCPU.

SUMMARY

In one embodiment disclosed herein there is provided a system comprising:
a solid oxide fuel cell having an anode and a cathode;
an anode recycle loop; and
an adiabatic steam reformer positioned in the anode recycle loop.

In a further embodiment disclosed herein there is provided a system comprising:
a solid oxide fuel cell having an anode gas inlet, an anode gas outlet, a cathode gas inlet, and a cathode gas outlet; and
an adiabatic steam reformer fluidly coupled to the anode gas outlet, the anode gas inlet, and to a fuel supply.

Also disclosed herein is a method comprising:
introducing at least a portion of a steam-containing anode exit gas from a solid oxide fuel cell into a steam reformer;
introducing a fuel into the steam reformer;
adiabatically reacting the fuel with the steam from the steam-containing anode exit gas in the steam reformer to produce a hydrogen-containing reformate; and
introducing the hydrogen-containing reformate into an anode gas inlet of the solid oxide fuel cell.

The foregoing will become more apparent from the following detailed description, which proceeds with reference to the accompanying figures.

DETAILED DESCRIPTION

There is a need for highly efficient distributed power generation with higher efficiency than is available from conventional technologies and at a lower capital cost than is available from atmospheric SOFC fuel cell systems. Disclosed herein is an embodiment of a SOFC fuel cell power system that uses several design features to achieve 70% electrical generation efficiency (fuel LHV to net electric) in a significantly more compact package that simultaneously reduces the system capital cost. Key features include: 1) operating the SOFC stacks under pressure, 2) using a new material set for the SOFC cells, 3) use of a high rate of anode recycle (e.g., ~85%) with adiabatic steam reforming, 4) burning the waste anode purge stream to provide a hot exhaust, 5) using the hot exhaust to drive an expander, and 6) pressurizing the incoming air using a compressor driven to a large extent by the expander.

In certain embodiments, the SOFC systems disclosed herein are useful as on-ground distributed electrical generation system that includes a compressor/expander module configured for intaking and exhausting to air at 1 atm. Natural gas would be the fuel that would be introduced to the adiabatic steam reformer.

Figure 1:
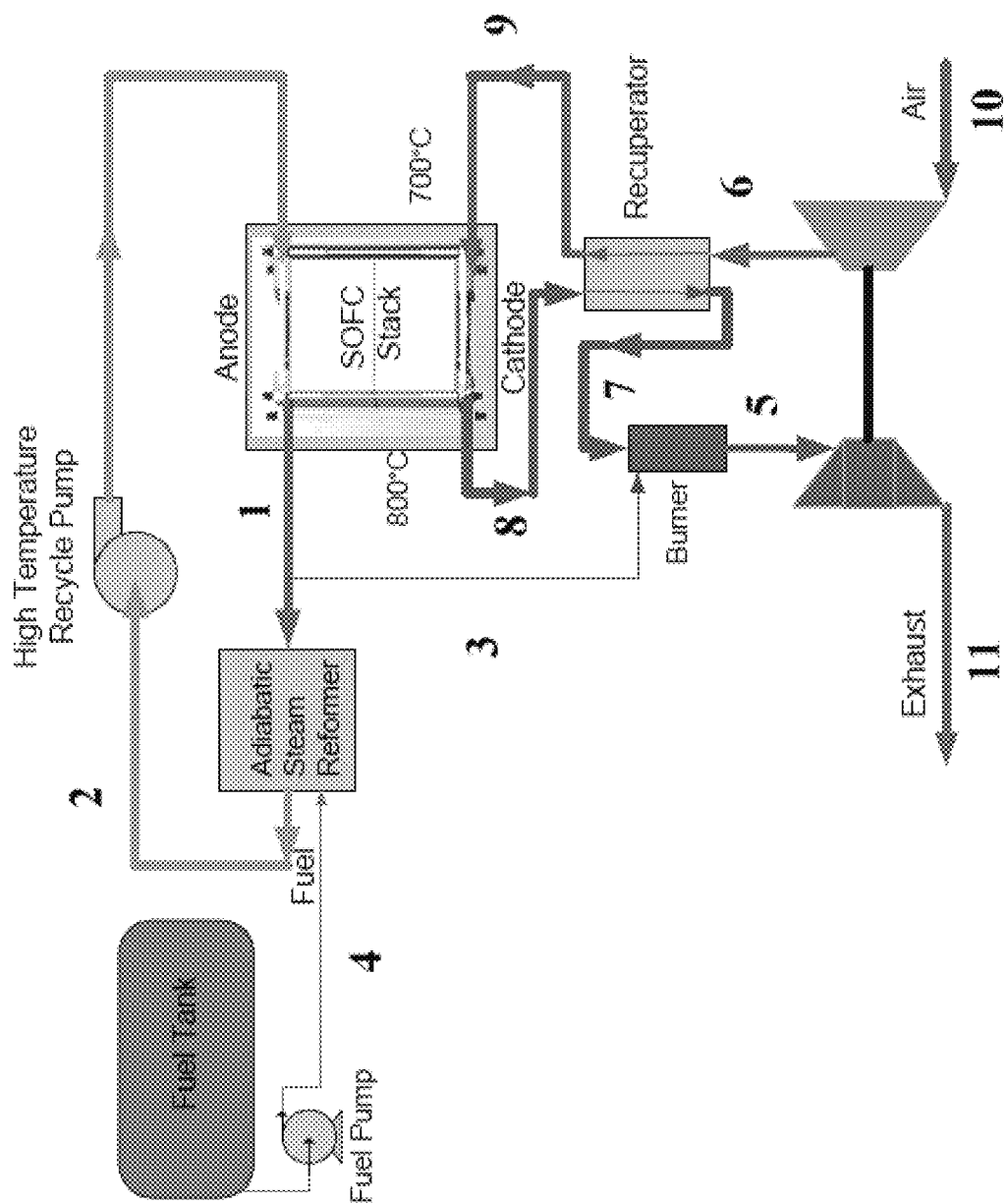
FIG. 1 depicts a flow diagram of one embodiment of an SOFC system disclosed herein.

FIG. 1 depicts a flow diagram of one embodiment of an SOFC system disclosed herein. The SOFC includes an anode inlet, an anode outlet, a cathode inlet, and a cathode outlet. The anode, electrolyte and cathode, in general, may be any material useful in an SOFC. In a typical SOFC, a solid electrolyte separates the porous metal-ceramic composite anode from a porous metal or ceramic cathode. Due to its mechanical, electrical, chemical and thermal characteristics, yttria-stabilized zirconium oxide (YSZ) is currently the electrolyte material most commonly employed. The anode in a typical SOFC is made of nickel-YSZ cermet, and the cathode is typically made of lanthanum manganites, lanthanum ferrites (e.g., lanthanum strontium ferrite (LSF)) or lanthanum cobaltites. Illustrative cathode materials include perovskite-type $La_{1-x}Sr_xMnO_{3-\delta}$ (LSM), $La_xSr_{1-x}Co_yFe_{1-y}O_{3-\delta}$ (LCSF), $Sm_{0.5}Sr_{0.5}CoO_{3-\delta}$ (SSC), $Ba_{0.5}Sr_{0.5}Co_{0.8}Fe_{0.2}O_{3-\delta}$ (BSCF), $LaNi_{1-x}Fe_xO_{3-\delta}$ (LNF), and layered double perovskite $MBa-Co_2O_{5-\delta}$ (M=Pr, Gd) (PBC or GBC). In such a fuel cell, the fuel flowing to the anode reacts with oxide ions to produce electrons and water. The oxygen reacts with the electrons on the cathode surface to form oxide ions that migrate through the electrolyte to the anode. The electrons flow from the anode through an external circuit and then to the cathode. The movement of oxygen ions through the electrolyte maintains overall electrical charge balance, and the flow of electrons in the external circuit provides useful power. In one embodiment, the anode is nickel metal-yttria stabilized zirconia (Ni-YSZ) cermet, and the cathode is $La_xSr_{1-x}Co_yFe_{1-y}O_{3-\delta}$, (e.g., $La_{0.6}Sr_{0.4}Co_{0.2}Fe_{0.8}O_3$ (LSCF 6428)). Illustrative SOFCs are shown in U.S. Pat. No. 7,758,992, which is incorporated by reference herein.

A further embodiment utilizes a new materials set for the SOFC. The cathode comprises $La_{0.6}Sr_{0.4}Co_{0.2}Fe_{0.8}O_3$ sintered at 1050° C., infiltrated with $Sm_{0.5}Sr_{0.5}CoO_{3-x}$ (SSC), and sintered at 850° C. prior to operation. The SSC forms a thin film on the surface of the porous LCSF cathode (see Lou et al., Solid State Ionics 180 (2009) 1285-1289). Other materials could be used to provide surface modification to the cathode via infiltration such as those described in Ding et al, Energy Environ. Sci. 2014, 7, 552-575.

The system includes an adiabatic steam reformer in an anode gas recycle loop. The adiabatic steam reformer receives the anode exhaust gas from the SOFC via stream 1. In certain embodiments after gases exit the SOFC anode ~15% of the gas is routed to a combustor via stream 3 rather than to the steam reformer. In certain embodiments less than 15%, or less than 10%, of the gas is routed to a combustor. In certain embodiments the remainder of the anode exhaust gas is mixed with fuel before entering the reformer. For example, in certain embodiments ~85% of the anode exhaust gas is introduced into the reformer. In certain embodiments 80% to 95%, more preferably 85% to 90%, of the anode exhaust gas is introduced into the reformer. In certain embodiments at least 90% of the anode exhaust gas is introduced into the reformer.

The system may be configured for $CO_2$ capture from the anode exhaust gas. In this embodiment, the anode exhaust gas may pass through a separation module that removes at least a portion of the $CO_2$ (and in certain embodiments at least a portion of the $H_2O$) and then returns any $H_2$, CO or $CH_4$ to the anode loop.

In certain embodiments, the system does not include a combustor. In these embodiments, the anode exhaust gas may be vented to the ambient atmosphere.

In certain embodiments, the anode exhaust gas may be mixed with fuel within the reformer. In the reformer, the mixture of anode waste gas and fuel reacts over a catalyst to generate fresh reformate which is then recycled back via stream 2 to the anode inlet via an anode recycle pump. In certain embodiments the reformer uses a catalyst consisting of a small amount of rhodium metal dispersed onto a magnesia-alumina spinel support. The catalyst material is then coated onto a FeCrAlY metal foam. As the mixture of hot anode exhaust and fuel passes through the foam, the fuel reacts with steam to form CO and $H_2$. The reaction is endothermic which results in a decrease in the reaction temperature as the reaction proceeds. Some of the CO formed shifts to $CO_2$ via the exothermic WGS reaction. In addition, as the CO and $H_2$ concentration increases, the exothermic methanation reaction becomes important. These reactions help to prevent the reforming reaction from quenching due to the drop in temperature, allowing an adiabatic steam reforming reaction to be performed.

Illustrative steam reforming catalysts include precious metals such as rhodium, ruthenium, platinum or nickel. Rhodium is preferred due to its high activity at low temperature while nickel provides a lower cost but results in a larger reformer due to its lower activity. The metal is dispersed on an oxide support consisting of alumina, alumina spinel or ceria. Selecting a support with fewer acidic sites reduces the potential for cracking of the hydrocarbon. In some cases alkali metals are added to the support to reduce the propensity to form carbon although this adversely affects the activity for steam reforming.

The fuel provided to the steam reformer may, in general, may be any fuel useful in steam reforming. Illustrative fuels include light hydrocarbon fuels such as methane, propane or butane; gasoline; diesel; jet fuel; biofuel; JP-8 (a military fuel very similar to commercial jet fuel); and JP-10 (a missile fuel that is essentially a single compound that provides high reaction heat per unit volume). In the embodiment shown in FIG. 1 the fuel is supplied via stream 4 to the adiabatic steam reformer. A fuel pump may be coupled to stream 4 in order to supply the pressurized fuel, for example, fuel at a pressure of 1 to 150 psig.

The assumed operation does not include the addition of air to the reforming mix (as in an ATR or PDX reformer) nor does it require a heat input from a separate combustion stream (as in a conventional steam reformer). This type of steam reformer operation is important to achieving the high efficiency of the overall SOFC power system.

A combusted anode exhaust gas stream 5 from the burner is introduced into an expander portion of a compression/expander turbine. After undergoing expansion, the exhaust gas exits the system via an exhaust gas exit line 11.

Pressures in the anode are controlled to match the cathode pressure. As a result, except for minor pressure drops due to flow of gases through components, the pressures at locations 1 through 9 will all be similar. These pressures will range from 1 atm to 10 atm, more preferred between 3 atm and 8 atm. Temperatures at the outlet of the SOFC will vary between 725° C. and 850° C., more preferred between 775 and 825° C. while temperatures at the fuel cell cathode inlet vary from 550 to 700° C., more preferred between 675 and 725° C. Temperatures at the anode inlet vary 550 to 675° C., more preferable between 600 and 650° C. A heat exchanger may be used to equilibrate the temperatures of the cathode and anode inlets before entering the stack. The component compositions of each stream will vary with a number of factors including the fuel composition, single pass fuel utilization within the stack, and the recycle ratio. Flowrates vary primarily in relation to intended power output from the system but will also vary with the efficiency of the system. The table below gives one set of process conditions calculated for the set of assumptions described below the table.

TABLE 1

Sample Flowsheet Conditions for FIG. 1

| | stream #, FIG. 1 | | | | | | | | | | |
|---|---|---|---|---|---|---|---|---|---|---|---|
| | 1 | 2 | 3 | 4 | 5 | 6 | 7 | 8 | 9 | 10 | 11 |
| Flow mol/s | 10.33 | 9.78 | 1.55 | 0.52 | 12.95 | 12.33 | 11.41 | 11.41 | 12.33 | 12.33 | 12.95 |
| Temperature, C. | 800 | 632.5 | 800 | 25 | 793.3 | 344.1 | 420.4 | 800 | 700 | 25 | 528.6 |

TABLE 1-continued

Sample Flowsheet Conditions for FIG. 1

| | stream #, FIG. 1 | | | | | | | | | | |
|---|---|---|---|---|---|---|---|---|---|---|---|
| | 1 | 2 | 3 | 4 | 5 | 6 | 7 | 8 | 9 | 10 | 11 |
| Pressure, atm | 8 | 7.985 | 8 | 8 | 7.86 | 8 | 7.86 | 7.895 | 7.965 | 1 | 1 |
| Mol Fractions | | | | | | | | | | | |
| CO2 | 0.2852 | 0.2747 | 0.2852 | 0 | 0.0480 | 0.0003 | 0.0003 | 0.0003 | 0.0003 | 0.0003 | 0.0480 |
| CO | 0.0483 | 0.0493 | 0.0483 | 0 | 0 | 0 | 0 | 0 | 0 | 0 | 0 |
| CH4 | 0 | 0.0285 | 0 | 1 | 0 | 0 | 0 | 0 | 0 | 0 | 0 |
| H2 | 0.1009 | 0.182246 | 0.1009 | 0 | 0 | 0 | 0 | 0 | 0 | 0 | 0 |
| H2O | 0.5655 | 0.465215 | 0.5655 | 0 | 0.0953 | 0 | 0 | 0 | 0 | 0 | 0.0953 |
| O2 | 0 | 0 | 0 | 0 | 0.1046 | 0.2099 | 0.1464 | 0.1464 | 0.2099 | 0.2099 | 0.1046 |
| N2 | 0 | 0 | 0 | 0 | 0.7431 | 0.7803 | 0.8430 | 0.8430 | 0.7803 | 0.7803 | 0.7431 |
| Ar | 0 | 0 | 0 | 0 | 0.0090 | 0.0095 | 0.0103 | 0.0103 | 0.0095 | 0.0095 | 0.0090 |

*Assumptions: 1 atm air intake, compression to 8 atm, 0.825 V/cell, methane fuel with 55% single pass fuel utilization, 80% polytropic compression, 70% polytropic expansion, 800 C. stack outlet, electrical assist on compression with net 270 kW electrical output.

In the embodiment shown in FIG. 1, air is introduced via air inlet line 10 into a compressor portion of the compression/expander turbine. Compressed air is introduced into a recuperator via stream 6. The recuperator heats the compressed air which is then introduced into the SOFC cathode inlet via stream 9. Cathode exhaust gas is introduced via stream 8 into the recuperator in order to transfer heat from the cathode exhaust gas to the cathode inlet gas. Cathode exhaust gas from the recuperator is introduced via stream 7 into the burner to combust with the anode exhaust gas. As described above, the burner exhaust gas is supplied via stream 5 to an expander turbine. The expander turbine is coupled to the compressor for the air feed.

Figure 2:
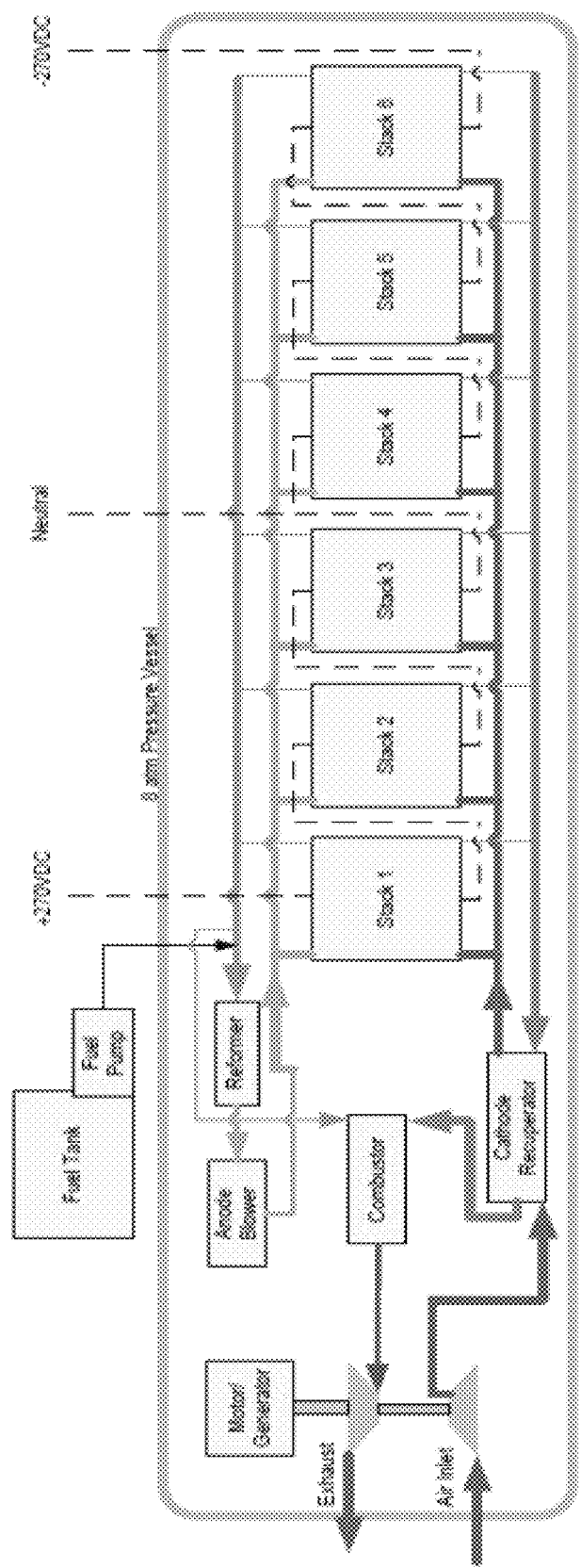
FIG. 2 depicts a flow diagram of one embodiment of an SOFC system disclosed herein that includes fuel stacks.
Figure 3:
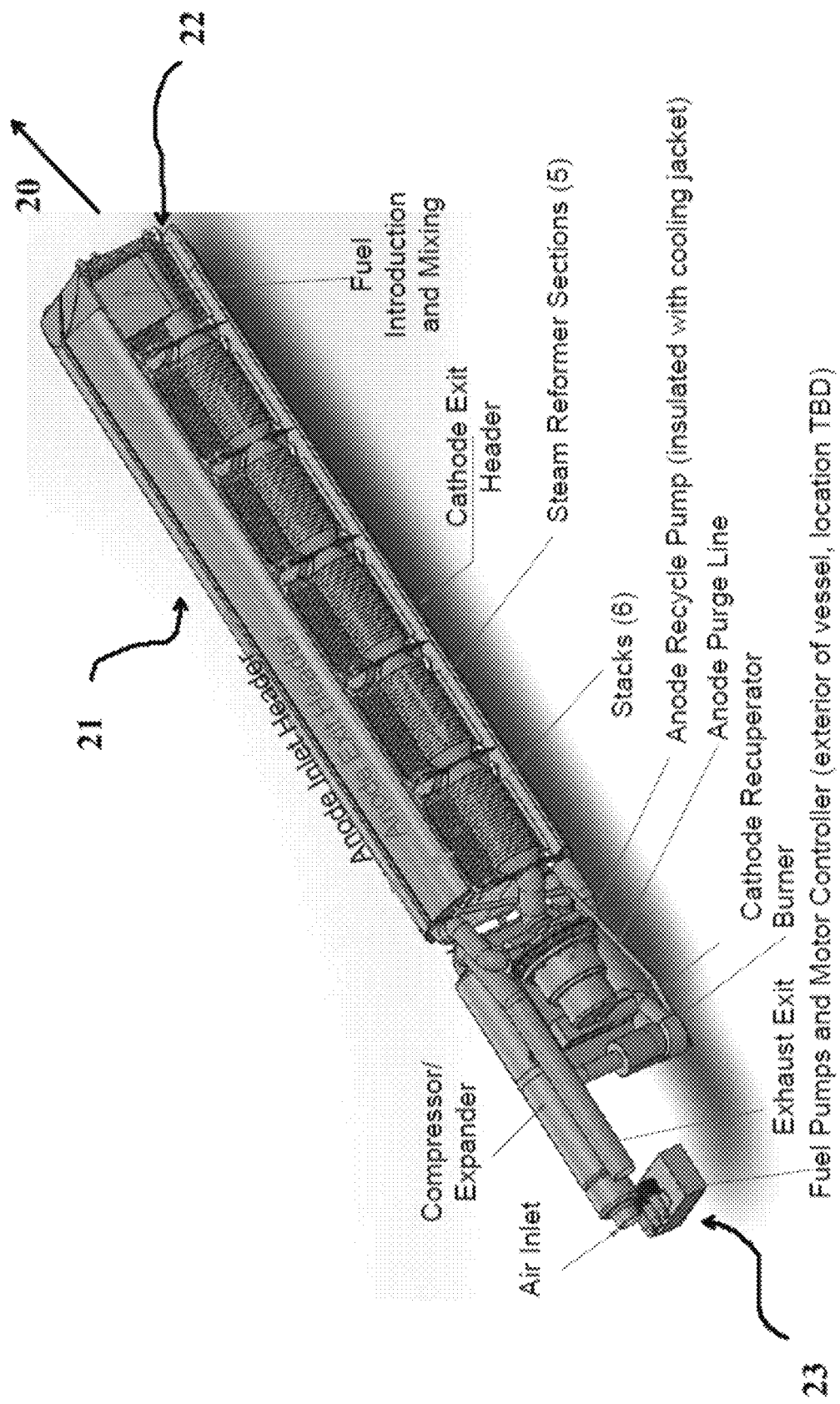
FIG. 3 is a perspective view of one embodiment of an SOFC system disclosed herein.

In certain embodiments, the SOFC, the steam reformer, the burner or combustor, the cathode recuperator, and the compressor/expander are all located within a single insulated pressure vessel with the air inlet line 10 and exhaust line 11 penetrating the vessel as shown, for example, in FIGS. 2 and 3.

For example, a pressure vessel capable of holding 8 atm may be used to contain the stack and hot heat exchangers. The heat loss from the vessel must be limited in order to maintain system efficiency and also to protect adjacent structures or systems within the aircraft. Heat loss may impact the process efficiency through a reduction in the temperature entering the expander which would reduce the power produced by the expander.

Several options for the insulated pressure vessel were considered including:

Insulate Inside the Pressure Shell—By insulating inside the pressure shell the material of construction of the pressure vessel does not need to be compatible with the interior temperatures. This allows an aluminum or titanium alloy to be considered for the pressure vessel. However, this increases the diameter of the pressure shell which offsets some of the weight savings. Also this requires a non-vacuum insulation which results in a greater insulation thickness.

Vacuum Insulation Outside the Pressure Shell—In this case the diameter of the pressure vessel is reduced but the pressure shell must be compatible with the high temperature of the interior of the vessel. In this case the alloy is assumed Inconel 625 which is a nickel based alloy with good creep resistance. Using vacuum insulation outside the pressure shell requires a barrier on the outside of the insulation to maintain vacuum. However, the insulation layer is thinner and lighter due to the lower thermal conductivity.

MLI Insulation Outside the pressure shell—MLI insulation consists of multiple low-emittance films with thin separating layers to prevent physical contact between layers to minimize heat conduction. Unlike the more conventional vacuum insulation it cannot support the outside vacuum barrier against atmospheric pressure. As a result it must have a self-supporting outside pressure barrier.

Nano-Porous Vacuum Insulation—This insulation uses a vacuum to enhance the insulation performance. NanoPore 150 is selected as a representative of this approach. The insulation has a density ~0.24 g/cc when sealed with a low temperature polymeric vacuum barrier and has the ability to support itself against 1 atm pressure. This vacuum microporous insulation approach provides a barrier with conductivity of ~0.01 W/mK. The insulation shows good performance at a moderate vacuum of 100 mbar making problems related to degradation of vacuum less likely.

Microtherm Super-G—This insulation does not require a vacuum jacket. Microtherm super G insulation is based on pyrogenic silica with a mineral oxide opacifier and E-glass filament reinforcement. The insulation can be provided premolded to a curved cross section such as a pipe making application of the insulation to the body of the vessel straight forward. If mounted on the vessel interior, the vessel wall would not need to be capable of handling the high temperature of the vessel interior and could be made in titanium or aluminum as long as sufficient attention is paid to the potentially high temperatures where process gases leave the vessel.

MLI Insulation—MLI insulation would incorporate multiple low-emittance films in place of the continuous nanoporous insulation fill. The films would need to be prevented from contacting each other and a vacuum pulled to minimize the importance of thermal conduction in the insulation layer. This insulation could not support a vacuum barrier against 1 atm of pressure and so the exterior barrier must be self-supporting. MLI insulations are common in cryogenic applications and in spacecraft where the requirement for a vacuum does not require a shell. The MLI typically consists of very thin aluminized polymeric film with low emittance that is separated by crinkling or use of a scrim layer to prevent direct contact between film layers. At sub-ambient temperatures the effective thermal conductivity can be <0.0001 W/mK (for example see Bapat et al. 1990), while values as low as 10 μW/mK are achievable (Scurlock and Saull 1976). MLI insulation can readily be found for application at low temperatures. High temperature MLI films consist of aluminized Kapton or polyimide layer plus a spacer scrim such as glass cloth and are suitable for temperatures as high as 200° C. to 400° C. depending on construction. MLI for higher temperatures is less common due to the incompatibility of polymeric materials with the temperature. However, there has been some work examining higher temperature MLI insulations. The performance of MLI insulations at temperatures up to 1000° C. was examined by Daryabeigi and coworkers. The insulations consisted of a proprietary film coated with gold that was separated by layers of fibrous insulation (primarily to prevent contact of films). A 4 film layer measured 13.3 mm thick, provided a density of 47.3 kg/m3 and provided an effective thermal conductivity for a 1000° C. temperature difference of 0.02 W/mK with a vacuum pressure of ~10 Pa. The performance degrades if vacuum is degraded or lost, reaching about 0.06 W/mK at 1000 Pa and about 0.09 W/mK at atmospheric pressure. Li et al. (2009) report results for a new high temperature MLI consisting of alumina silicate papers and a silica fiber net with silica aerogel granules as a filling. They report 0.08 W/mK at 1000° C. and a density of 0.25 g/cm3. Some work has been done toward the development of "integrated MLI" which would provide a frame to support and separate layers and support the exterior pressure shell. This approach could potentially decrease the weight to ⅓ the weight required to provide a pressure shell. Weight savings would be less for the current application since the inner shell is designed to contain the vessel pressure and only the outer shell would be impacted.

For purposes of comparing the potential design approaches, the straight side of the cylinder was set at 94.624 in., which allows space sufficient for 8 stacks with 0.25 in. space between each stack. The actual vessel will contain six stacks with the extra two stacks worth of space provided to allow room for the hot balance of plant equipment. The required clear inside diameter was set at 20.75 in. This allows the stacks to be positioned in the center of the cross section with adequate room for anode and cathode ducting and an ~2-in. clearance from the corner of the stack to the inside wall (or insulation surface) of the vessel. Acceptable heat loss from the vessel was taken to be 0.5% of the gross electrical output from the stacks. Heat loss at this level will have a very small impact on performance. This assumption results in a heat loss value of 1353 watts for each of the three vessels. The insulation thickness in each case was adjusted to limit the heat loss to this value. The vessel was designed assuming an internal pressure with a differential relative to the outside pressure of 8 atm. This is slightly conservative since the stack pressure is expected to be 8 atm and the pressure outside the vessel will never actually be zero. When the pressure shell is placed inside the insulation, failure is determined by creep rupture phenomenon. In this case, the rupture stress corresponding to the temperature and creep duration was estimated by correlation to creep data for the alloy using the Larson-Miller parameter. The allowable stress was taken as one third of the predicted creep rupture stress. For the low temperature titanium shell pressurized from the interior, the failure of the vessel is determined by the yield stress. An allowable stress was obtained by dividing the yield stress by 1.5. When considering aluminum for the same application, the allowable stress was determined by dividing the yield stress by 2. The greater margin relative to yield was applied in recognition that vessel strength may need to be increased to account for fatigue phenomenon which is a greater concern for aluminum alloys. However, no detailed analysis of fatigue was attempted. For self-supporting shells required to create a vacuum space suitable for use of the MLI insulation, the exterior shell must resist a 1 atm external pressure against a near zero internal pressure, without relying on interior support. In this case the failure of the shell is dominated by elastic buckling. The buckling pressure was estimated using a theoretical expression for a thin wall perfectly cylindrical cross section. Application of this expression is non-conservative since defects in the cross section reduce the buckling pressure. In an attempt to compensate for this a safety factor of 3 was applied to the expected 1 atm pressure loading and the wall thickness adjusted to show buckling failure at 3 atm. The wall thickness determined was applied to both the straight side of the cylinder as well as the hemispherical ends without performing any additional buckling analysis for the vessel ends.

For the case where insulation is placed on the exterior of the pressure shell, Inconel 625 was selected for its high temperature compatibility and creep resistance. For the case where insulation is placed on the inside of the pressure shell the shell is not exposed to the high temperature interior of the vessel and lower temperature alloys can be considered. Two alloys were considered, Ti—Al6-4V and Aluminum 7075-T6. The key material properties used when assessing the design with these materials are summarized below.

Inconel 625—The thickness of the vessel is designed based on a safety factor of 3 relative to creep rupture. Design conditions assumed operation at 700° C. with 8 atm differential pressure, and a creep lifetime requirement of 10,000 hrs. This results in an allowable stress of 7119 psi. The density is 8.44 g/cc.

Titanium Ti-6Al-4V—The yield stress is taken as 128,000 psi and a safety factor relative to yield of 1.5 is applied to arrive at an allowable stress of 85333 psi. The density is 4.43 g/cc. Young's modulus is 16500 ksi. Poisson's ratio is 0.342.

Aluminum 7075-T6—The yield stress is taken as 63,000 psi and a safety factor relative to yield of 2 is applied to arrive at an allowable stress of 31,500 psi. The density is 2.81 g/cc. Young's modulus is 10,400 ksi. Poisson's ratio is 0.33.

Table 2 shows the estimated masses for each of the analyzed configurations. The lower density of the MLI insulation was overwhelmed by the mass required to provide an outer vacuum shell that was stable against elastic buckling. The nanopore vacuum insulation was somewhat better that than MLI, primarily due to the fact that a thin 0.005-in. skin could be used to provide the outer vacuum barrier while relying on the insulation to support the barrier against the inside pressure shell. The lightest weight solution was the Microtherm Super-G Insulation installed on the inside of the pressure shell. Using this approach an aluminum or titanium pressure shell could be used, minimizing the weight of the pressure shell. The titanium shell was slightly lower weight but the aluminum shell could be used if cost is a driver between the two approaches.

TABLE 2

Estimated Weights for Analyzed Pressure Shell and Insulation Combinations

| Vessel and Insulation Combination | Weight of One Vessel, kg | Weight of 3 Vessels, kg |
|---|---|---|
| Inconel Inner + Nanopore Vacuum + 5 mil skin | 194.3 | 582.8 |
| Inconel Inner + MLI Vaccum + Ti outer | 361.3 | 1084.0 |
| Inconel Inner + MLI Vaccum + Al Outer | 314.3 | 942.8 |
| Microtherm Inside + Aluminum Outside | 122.0 | 366.1 |
| Microtherm Inside + Titanium Outside | 115.7 | 347.2 |

Based on this analysis the design approach of a titanium shell with Microtherm Super G insulation installed on the interior is assumed for the remainder of the analysis.

In certain embodiments more than one SOFC can be arranged into a solid oxide fuel stack. A plurality of solid oxide fuel stacks can be arranged to form an electrical generation system. For example, the embodiment shown in FIGS. 2 and 3 includes a plurality of solid oxide fuel stacks arranged along an axial direction 20. The individual stacks may be fluidly coupled in series with each other. The fuel stack series is fluidly coupled to the other system components as shown in FIGS. 2 and 3.

The steam reformer(s) are positioned parallel to the individual fuel stacks in the axial direction 20. The fuel stacks and the steam reformers are located within a pressure vessel which may be cylindrical-shaped. The pressure vessel is shown as the "outer shell" in FIG. 5. A fuel inlet is located at a first end 22 of the pressure vessel and an exhaust outlet is located at a second opposing end 23 of the pressure vessel. The compression/expander, cathode recuperator, and burner are all located between the second end 23 of the pressure vessel and the fuel stacks/steam reformers.

The system shown in FIGS. 2-5 includes five reformer sections each adjacent to five of the six stacks. The flow passes through the sections sequentially; the flow goes through the anode blower and then flow is redistributed to the six stacks. Breaking the reformer into segments was done to allow the flow to pass through holes in the support structure positioned at the break points between each cell. The support structures on the side opposite the reformer can be seen in FIG. 4.

In certain embodiments, the fuel cell design is based on the Delphi Gen4 stack, although several modifications are assumed to be made to tailor the stack to the current design. The standard Delphi stack is configured with the flow headers entering and exiting on the same side of the stack. To improve the layout and minimize the length of connecting tubing the headers of the stack were redesigned. The anode gas header was designed to be entering and exiting on one end with the cathode gas header to the other. Power density in the active area of the cell is estimated to be 0.76 W/cm2 at 0.825 V/cell. This represents a significant increase compared to power density in the Delphi APU which is believed to operate with about 0.27 W/cm2 at 0.8 V/cell. Several changes contribute to this 2.8× increase in power density:

A recently developed material set which shows power densities 1.75× higher than the previous material set is assumed to be used for the SOFCPU.

The fuel cell is operated at 8 atm absolute pressure. Compared to operation at 1 atm, this provides a 2.32× increase power density.

The operating voltage is selected to be 0.825 V/cell which improves efficiency but reduces power density by a factor of 0.84× compared to what would be obtained at 0.8 V/cell.

The remaining factor, a ~0.82×1 reduction, is attributed to the reforming approach and flowsheet configuration. The aircraft system uses anode recycle steam reforming compared to the Delphi APU which uses PDX with limited anode recycle. While this choice results in a reduction in power density due to dilution with steam and $CO_2$, the impact is modest since dilution with nitrogen is avoided. Anode recycle steam reforming provides a critical boost to overall system efficiency due to the conversion of waste heat to chemical energy. In addition, the fact that 85% of the anode exit gas is recycled improves the overall fuel utilization.

The stacks containing the new material set and operating at 8 atm are modified and arranged as follows:

The stacks are organized in stacks of 109 cells in order to provide 109*0.825=89.9V or ~90 V/stack. This is taller than the nominal 30-cell Delphi Gen4 APU configuration although Delphi has modeled up to 100 cells to assure adequate flow distribution.

In each of 3 independent systems, six stacks connected electrically in series with a ground connection in the center of the series to provide ±270 VDC. This results in a total of 6*109=654 cells in each of the three systems.

The active area flow length is increased by a factor of 1.36 in order to bring the total power for 3 systems to 821 kW. This adds 2.13 in. (5.4 cm) to the flow length, increasing the cell footprint to 12.613 in.×11.58 in.

Connections to the stack are made anode on one end and cathode on the other rather than using a manifold plate connecting both flows from one end. This is done to reduce the weight.

Pressure drop across the active area portion of the cell is intentionally increased to 24 in. $H_2O$ and the sizes of the anode and cathode header holes adjusted to improve flow distribution as described below.

The operation of this type of reformer has been demonstrated experimentally both in reforming experiments as well as with actual anode gas recycle from an SOFC. The fuel used in these experiments included both a Syntroleum S8 and Shell GTL. Both fuels are Fischer-Tropsch liquids with properties similar to jet fuel but with near zero sulfur. Fitting of data to the temperature vs. conversion profile obtained within the reformer suggested an activation energy of approximately 200 kJ/mol. The activation energy is roughly consistent with a value for 180 kJ/mol for carbon-oxygen bond formation on the planer surface of rhodium crystallites during methane steam reforming determined by van Grootel et al. (2010). The reforming catalyst assumed for the design would be expected to show a small increase in activity with increasing pressure at a fixed temperature. However, this effect is minor compared to the effect that pressure has on the reaction temperature. Operation at 8 atm has a major impact on reformer size through the influence it has on the finish temperature due to the higher methane formation occurring at pressure. At 1 atm, and 800° C. anode outlet, the final temperature is ~570° C. with 1.8% methane while at 8 atm a temperature of ~643° C. is expected with 3.5% methane. Based on this temperature difference and an activation energy of 180 kJ/mol, the low temperature zone of the reformer (which dominates overall size) shrinks by a factor of about 7.75. The catalyzed foam for the reformer is expected to require a volume of 15 liters (913 in.3) with a weight of 11.3 kg. The foam is placed within a duct running down one side of the stacks as will be shown in the FIGS. 3-5.

The systems and methods disclosed herein provide distributed power generation that may have lower fuel consumption, reduced capital cost, and an overall lower levelized cost of electricity (LCOE) compared to competing technologies. The fuel cell is based on a Delphi Gen 4 stack with a new material set which is capable of 1.75 times higher power density than the more established materials currently used. The weight of the stack was taken to be 62 kg for a 100 cell stack. This weight represents the current weight of a 100 cell Gen 4 stack design minus a relatively heavy base plate and frame (33.5 kg). When performing the subsequent detailed design a lighter weight header and frame was designed to provide for distribution of the gases into and out of the stacks. The power density in the stack is a function of anode gas composition, fuel utilization, excess air (which determines average cathode oxygen concentration), the average inlet and outlet temperature of the stack and the operating pressure and voltage. Stack electrical conversion efficiency is purely a function of stack voltage. In all cases the stack was assumed to operate with an outlet temperature of 800° C. and this temperature was achieved by adjustment of the rate of cathode air supplied to allow a steady state heat balance with 800° C. outlet on the stack. The fuel cell anode and cathode are operated at the same pressure and the fuel cell is operated inside a vessel maintained at the same pressure as the fuel cell.

In certain embodiments the SOFC system compresses ram air to operating pressure in a compressor (80% efficient) and then expands the exhaust gases through a turbine (85% efficient) to ambient in order to recover mechanical energy. For flowsheets in which more energy was required for compression than was available from expansion it is assumed an electric motor provides the additional power, which subtracts from the power generated. For flowsheets in which excess power was available the shaft power is assumed to be converted to ±270V DC at 57.6% efficiency based on: (96% gear box)×(80% mechanical to AC electric)×(75% to ±270V DC)=57.6%. This assumption places the efficiency for the mechanical to ±270V DC conversion at a lower value than achieved by the 787 generator and ATRU which is 86.6% (i.e. 97% gearbox X 92% generator X 97% ATRU).

Under normal flight conditions the aircraft compresses ambient air to cabin pressure and then releases the air back to ambient without attempting to recover energy. Although it might seem natural to use this compressed air to avoid compressing air in the SOFCPU it was decided not to take this approach. First, it was determined that the SOFCPU must operate in the event of a cabin decompression. Hence, a compressor capable of using ambient air is still required. Second, the amount of air required exceeds the rate of air compression for the cabin. In addition, not all the air compressed for the cabin leaves in the exit valve. Some quantity leaks through door seals or other locations and these leaks tend to increase with aircraft age, making it difficult to rely on a specific quantity of cabin air available at a leak valve. Finally, anything that could potentially upset the controlled outflow of air from the cabin could lead to damage to the aircraft. Hence, although higher efficiency might be obtained by utilizing the exhausting cabin air as an input to the SOFCPU compressor/expander, this was not done for this study. Weight and performance of the compressor/expander was initially based on a Williams WR2 jet engine. This engine compresses 1 kg/s of air at a compression ratio of 4.1 and weighs 13 kg. In effect, the SOFC power system takes the place of the combustor in the jet engine with compressed air being delivered to the SOFC from the compression stage and hot exhaust gases from the SOFC power system expanding through the turbine. The engine is approximately the right size in terms of air flow for the power system operating at about 1.1 atm. To arrive at a weight estimate for various system configurations, the weight was scaled linearly based on the air flow and increased in linear proportion to the number of compression stages required. For example, for the 8 atm case the ratio of compression to existing engine is: (0.279 atm inlet P) (4.1 base CR)n=8 atm, where n is the number of repeats of the existing compressor stages in series required. Solving yields n=2.38 so the compressor weight estimate is increased by a factor of 2.38 to account for the higher pressure ratio. While it is not clear how accurate the extrapolation based on flow and compression ratio is, the weight impact of the compressor expander is relatively minor as long as construction similar to the jet engine can be used.

Autothermal reforming (ATR), single anode pass steam reforming and anode recycle steam reforming flowsheets were modeled. In general, the anode recycle steam reforming provided significantly higher system efficiency compared to the other approaches. In this approach all steam required for reforming is generated on the SOFC anode such that it is not necessary to generate steam from liquid. In addition, waste heat from the fuel cell drives the reaction allowing heat from the fuel cell to be converted back to fuel in the endothermic reforming reaction. This allows some waste heat to be converted back to fuel and have another chance at being converted to electricity.

Figure 9:
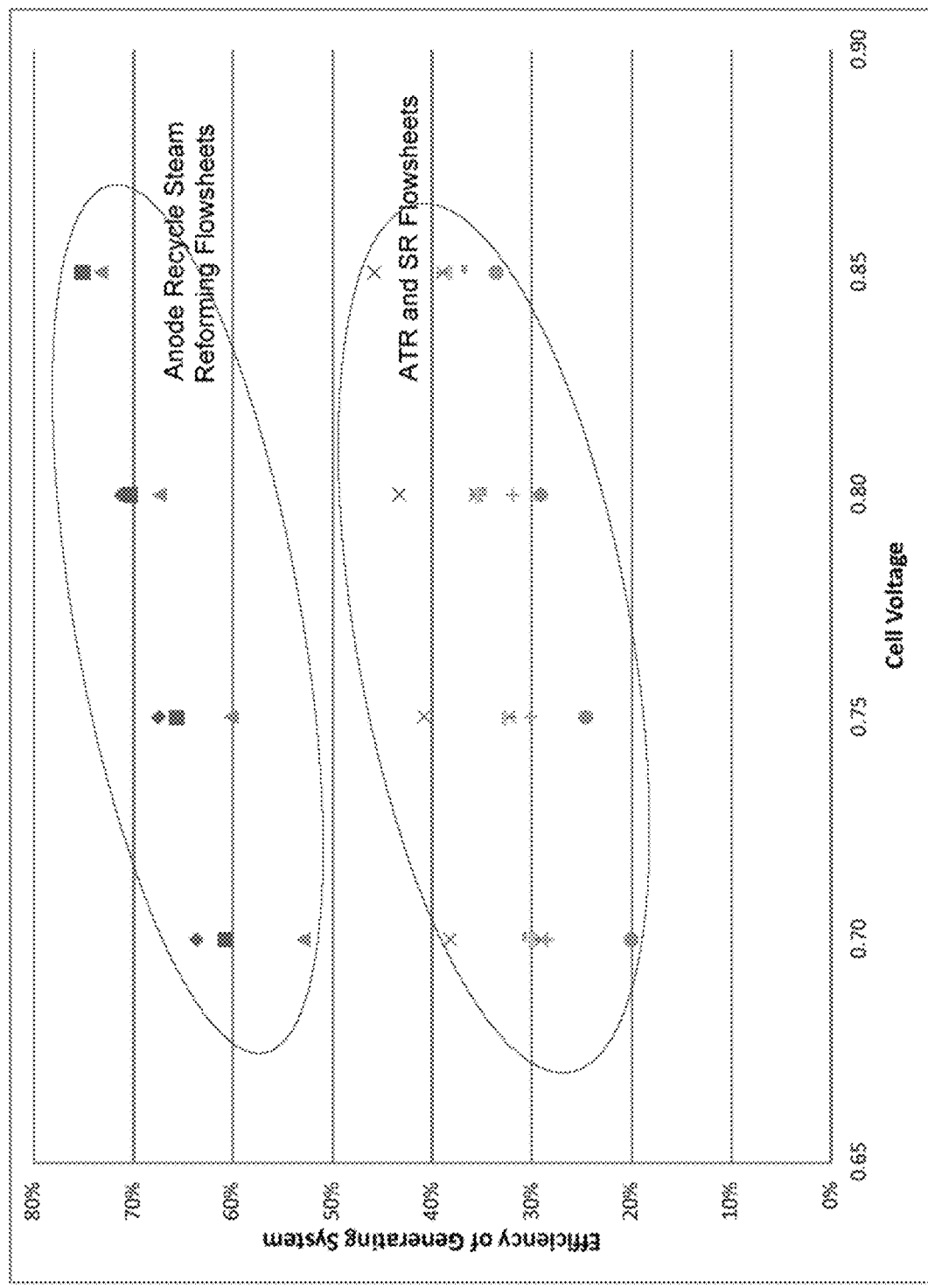
FIG. 9 is a graph depicting the efficiency of the anode recycle disclosed herein vs. other reforming as a function of cell voltage.

Different flowsheets obtained different amounts of power from the compressor/expander. For example for 3 atm and 0.8V the ATR flowsheet obtained 18% of power from the compressor/expander shaft. For the anode recycle steam reformer at the same pressure and stack voltage, only 4.3% of the power was obtained from the turbine. Since the SOFC offers higher efficiency than a turbine, efficiency is maximized by a flowsheet which has more power from the SOFC and less from the turbine as long as electrical power is not required as input to drive the compressor. Also, the decision to configure the system to generate DC power directly penalizes the turbine for losses in converting generated AC power to DC since there is no longer a 235 VAC bus. FIG. 1 shows the logical layout of the anode recycle flowsheet and FIG. 9 shows the higher efficiency compared to other flowsheets as a function of stack voltage.

In certain embodiments, the SOFC systems and methods disclosed may provide electrical power on board aircraft, particularly commercial aircraft. An illustrative example is "more-electric" airplanes such as the Boeing 787. More-electric airplanes minimize extraction of bleed air from the engine compressor stages and instead run electrical generators off the main engine shaft to satisfy electrical loads. More-electric airplanes have higher electrical generation rates and thus stand to show greater benefit from an increase in the efficiency of electrical generation. The SOFC technology disclosed herein may generate electrical power at higher efficiency than is achieved by using power from the main engine shaft to run a generator. Hence, unlike the existing auxiliary power unit (APU) which is turned off once the main engines are started, a solid oxide fuel cell power unit (SOFCPU) would operate throughout the flight to maximize fuel savings. SOFCPU's are expected to be somewhat heavier than turbine APUs resulting in a heavier aircraft. A key hurdle to demonstrate the feasibility of a SOFCPU is to show that the increase in fuel consumption due to the increase in aircraft weight is less than the savings obtained by operation of the SOFCPU. Unlike a turbine-based auxiliary power unit (APU) a solid oxide fuel cell power unit (SOFCPU) would be more efficient than using the main engine generators to generate electricity and would operate continuously during flight.

The potential performance of the SOFCPU was determined by coupling flowsheet modeling using ChemCAD software with a stack performance algorithm. For a given stack operating condition (cell voltage, anode utilization, stack pressure, target cell exit temperature), ChemCAD software was used to determine the cathode air rate to provide stack thermal balance, the heat exchanger duties, the gross power output for a given fuel rate, the parasitic power for the anode recycle blower and net power obtained from (or required by) the compressor/expander.

The SOFC is based on the Gen4 Delphi planar SOFC with assumed modifications to tailor it to this application. The size of the stack needed to satisfy the specified condition was assessed using an empirically-based algorithm. The algorithm predicts stack power density based on the pressure, inlet temperature, cell voltage and anode and cathode inlet flows and compositions. The algorithm was developed by enhancing a model for a well-established material set operating at atmospheric pressure to reflect the effect of elevated pressure and to represent the expected enhancement obtained using a promising cell material set which has been tested in button cells but not yet used to produce full-scale stacks. The predictions for the effect of pressure on stack performance were based on literature. As part of this study, additional data were obtained on button cells at elevated pressure to confirm the validity of the predictions.

An estimate of the electrical power required was developed based on an understanding of the Boeing 787 loads. The Boeing 787 engine generators produce 230 VAC power which is converted to ±270 VDC to drive the largest loads. In addition to generating a greater amount of electrical power than earlier aircraft, the 787 does so with dramatically improved efficiency. Compared to the 777, the 787 achieves twice the efficiency evaluated at the ±270 VDC loads. This is achieved using highly efficient direct drive variable frequency generators to replace less efficient generators with constant speed drives. In addition, advances in power electronics have enabled extraordinarily high efficiency in power conversions. The 787 Auto Transformer Rectifier Unit (ATRU) achieves 97% efficiency in converting 230 VAC to ±270 VDC and the transformer achieves 98% efficiency in conversion of 230 VAC to 115 VAC. Overall the 787 provides power to the ±270 VDC loads at 51% efficiency. This high efficiency reduces the amount of fuel that can be saved using highly efficient fuel cell systems compared to earlier aircraft. It is expected that similar measures could be taken on all future aircraft whether or not they are configured as more electric aircraft. This effectively raises the bar for the performance that must be achieved to provide a benefit using SOFC generated power. For SOFC generated power, a revised configuration for the 787 electrical distribution system was assumed to accommodate the fact that the SOFC produces DC rather than AC power. The 230 VAC bus is eliminated, loads are moved to the DC bus and the DC power is inverted to provide 115 VAC loads. These changes reduce the weight of power conversion equipment but due to assumptions for power conversion efficiency not being as high as the values achieved in the 787, the overall power generation required of the fuel cell system is slightly higher (972 kW vs. 944 kW). ChemCAD modeling examined several potential reforming and flowsheet options and determined that steam reforming using anode recycle was preferred due to the higher efficiency. A parametric study was then performed to estimate the efficiency and weight impact to the aircraft as a function of cell voltage (0.70, 0.75, 0.80, 0.825, 0.85 V) and operating pressure (0.8, 3.0, 5.5, 8 atm). The systems included a compressor/expander to compress air drawn in from the atmosphere and to expand the exhaust gases to recover work. Operation was evaluated assuming a cruising speed of Mach 0.85 and altitude of 40,000 ft. Simplified weight estimates for non-stack components were estimated by a linear ratio to the known weight of an existing 6.9 kWe SOFC system, by comparison to a small jet engine for the compressor/expander and using stress calculations to estimate pressure vessel weight. Credit was taken for eliminating the turbine APU and reducing the electrical converter weights.

Figure 4:
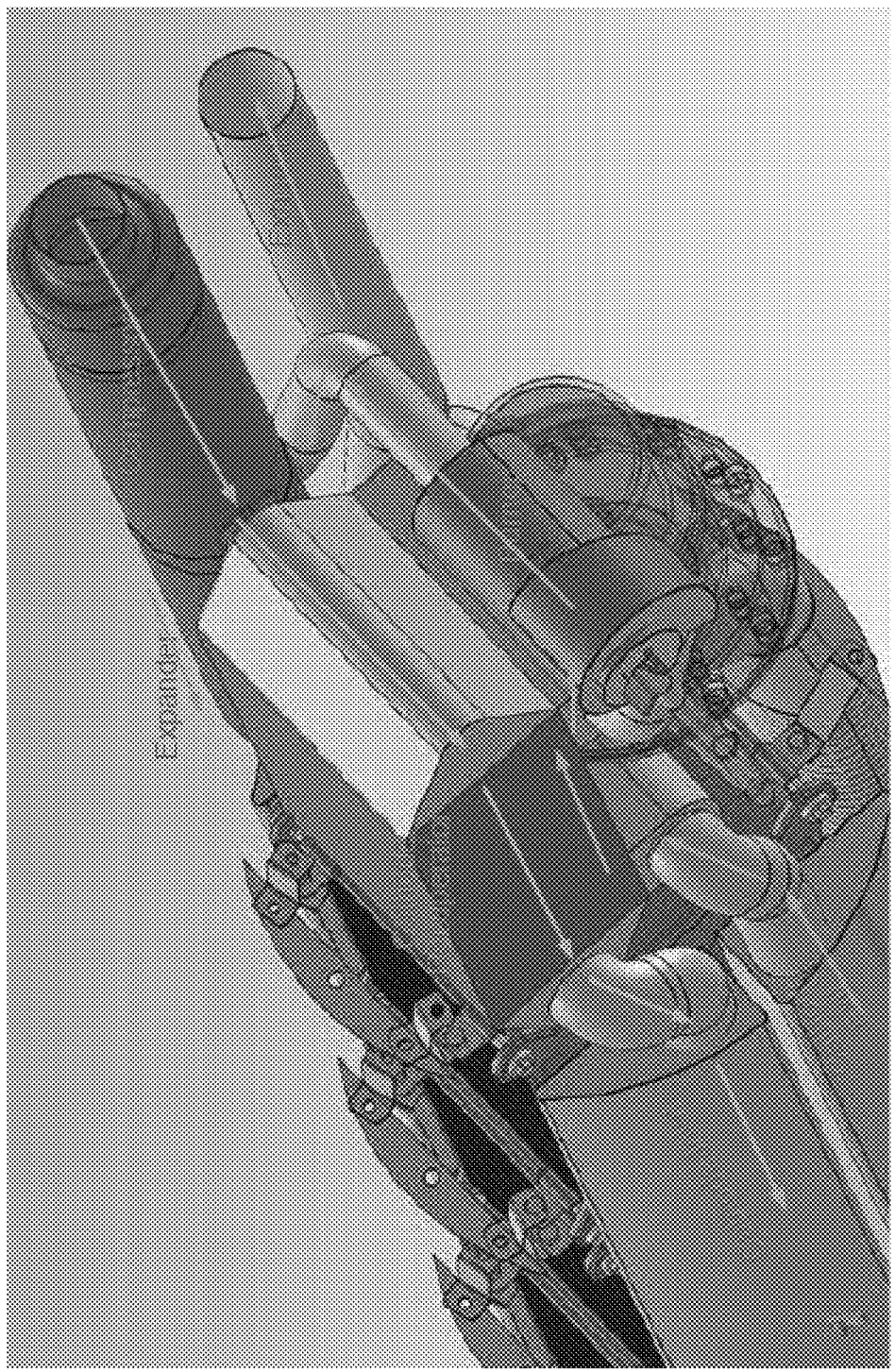
FIG. 4 is a perspective view of a first end of a SOFC fuel system disclosed herein showing gas pathway. Blue lines show the air path into the fuel cell while orange lines show the gas path after leaving the fuel cell.
Figure 5:
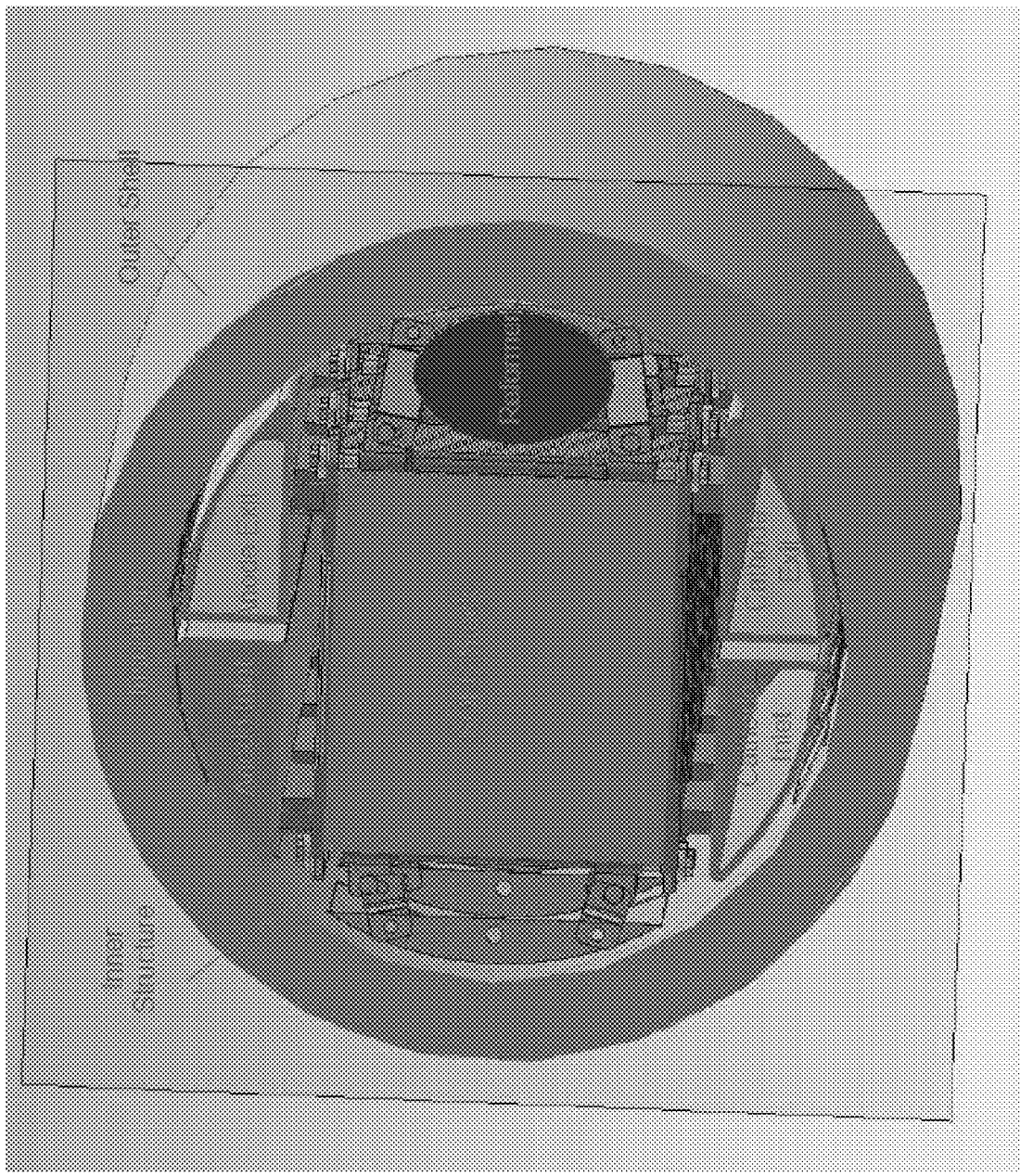
FIG. 5 is a perspective view of a cross section showing the arrangement of an SOFC stack, anode inlet, anode exit, reformer, cathode inlet and cathode exit, wherein the an SOFC stack, anode inlet, anode exit, reformer, cathode inlet and cathode exit are all arranged parallel to each other along an axial direction of the SOFC power unit.

Selecting the optimum condition requires a combination of the reduction in fuel due to electrical generation efficiency with the increase in main engine fuel consumption due to added weight. The effect of the SOFCPU weight impact on main engine fuel consumption was determined using a PianoX model of the 787-8. Flight profiles for trips of 1000, 3000, 5000 and 7000 nautical mile (nm) were calculated for a wide range of payloads to determine weight sensitivity for each trip length. A breakeven weight for the SOFCPU was then calculated by determining the point at which the fuel saved due to the efficiency of the SOFC would be offset by the added fuel consumption due to SOFCPU weight. The optimum condition was then selected based on the difference between breakeven weight and the estimated weight. For a trip length of 5000 nm where the optimum occurs at a cell voltage of 0.825 V and pressure of 8 atm. The condition of 0.825 V/cell and 8 atm was then used to develop a conceptual design for the system. The pressure vessel is proposed to consist of an inner Inconel frame with outer titanium pressure shell with insulation between. The overall system is divided into three redundant systems to allow the turbine APU to be eliminated. The stack frame and header design was modified to obtain adequate flow distribution and to allow six stacks to produce ±270 VDC. Design calculations were performed to size the cathode recuperator. Ducting and frame components were added to improve the overall size and weight estimates. A representation of the system is shown in FIGS. 3-5.

Based on the conceptual design, the total weight impact of adding three SOFCPU systems to supply the 787-8 (after adjusting for elimination of the APU and reduction in converter weight) would be 2822 kg. This is significantly less than the scoping weight of 4287 kg. The reduction is primarily due to effects of pressure on balance of plant (BOP) components which were not incorporated into the original screening approach. The smallest spread between the estimated weight and the breakeven weight occurs for shorter flights where the estimated system weight is about double the breakeven weight. The trend in breakeven weight results from the fuel consumption per mile for electrical generation being greater during the combined climb and descent phases of the flight where the velocity is lower than during the cruise condition. While there are a number of areas within the conceptual design that may increase in mass as the design increases in fidelity, the current mass is about three-quarters because of the stacks (62%) and the pressure vessel (15%). To begin saving fuel on the 787, the stacks will have to increase their specific power (power/weight) by more than a factor of two. However, the conceptual design may still be a viable system where a highly efficient SOFC system is needed but weight is not as critical.

A variety of potential system configurations and operating modes were analyzed to determine their efficiency and estimate their weight. Mass and energy balance was modeled using ChemCAD software coupled with a PNNL stack performance model of a planar anode supported SOFC. Approaches evaluated using a ChemCAD flowsheet included auto-thermal reforming, steam reforming with a single pass across the anode and steam reforming using anode recycle. All systems include a compressor/expander to compress air drawn in from the atmosphere and then expand the exhaust gases to recover work. All systems modeled were assumed to operate using desulfurized jet fuel that is loaded into a dedicated tank. Systems were evaluated for a condition where inlet air is received at 0.279 atm and −29.6° C., corresponding to an adiabatic, isentropic stagnation of air at 40,000 ft with an aircraft velocity of Mach 0.85. The expander is assumed to exhaust to atmospheric pressure at 40,000 ft (0.185 atm). The drag associated with the air intake is not currently included in the model of aircraft fuel consumption. The stack performance model is calibrated to actual data for a promising new electrode materials set. The stack model includes the effects of inlet temperatures, flows and compositions and the operating cell voltage on the power density achieved. SOFC operating pressures were examined at 0.8 atm approximately corresponding to cabin pressure at cruising altitude, 3 atm, 5.5 atm and 8 atm. Operating cell voltages of 0.70, 0.75, 0.80, 0.825 and 0.85V were analyzed. The 787 generates 230 VAC power from engine generators and converts the power to ±270 VDC to drive the largest loads. For SOFC generated power, a revised configuration for the 787 electrical distribution system was considered in order to take advantage of the fact that the SOFC generates DC rather than AC power. An estimate of the electrical power required was developed based on an understanding of the Boeing 787 loads. The relationship between added aircraft weight and fuel consumption is complex and depends on a number of factors. The impact of the addition of the SOFCPU weight on main engine fuel consumption was determined using a PianoX model of the 787-8. Flight profiles for trips of 1000, 3000, 5000 and 7000 nm were calculated for a wide range of payloads. The PianoX model was allowed to select appropriate parameters for each flight such as rate of climb, initial cruise altitude, rate of descent, etc., and provided fuel consumption data as a function of payload. A breakeven weight for the SOFCPU was then calculated by determining the point at which the fuel saved during the flight due to the efficiency of the SOFC would be cancelled out by the added main engine fuel consumption required to carry the SOFCPU weight. Preliminary estimates of the weight of the most favorable SOFCPU configurations were then compared to the breakeven weight as a function stack cell voltage and aircraft trip length. Finally, a single SOFCPU configuration and operating point was selected for a more detailed design and evaluation. This study was performed using input data provided for the Boeing 787 generators, ATRU and transformer efficiencies. Loads at the outlet of the generator were translated to loads at the point of use using the ATRU and transformer efficiencies. During review of the final report it was determined that the input data for generator, ATRU and transformer efficiencies corresponded to the Boeing 777 rather than the 787. Efficiencies for the 787 are much higher (51% vs. 25% efficiency overall evaluated at the ±270V DC bus) due to the use of a variable frequency generator and improvements in electronics for the 2.2 voltage conversion. The report has been corrected to reflect the 787 efficiencies. However, as a result of this error, the power rate used for the SOFC system design was lower (821 kW) than the revised target (972 kW) for the reconfigured SOFC powered electrical system. Rather than repeat the design effort at a slightly higher power level the discrepancy was resolved by assuming the same specific power would be achieved and linearly scaling the weight to the higher power level.

In certain embodiments, the SOFC systems disclosed herein may be used for power generation for a Boeing 787 aircraft. The effort resulted in the development of a high power density, compact, and efficient system. The system represents an economically advantageous system feasible for distributed power generation applications, e.g., for distributed power generation from natural gas.

The ability of a SOFCPU to save fuel once installed in an aircraft is a balance between more efficient electrical power generation which saves fuel and an increase in aircraft weight which requires more fuel be burned for a given flight. As the SOFCPU is integrated into the aircraft, a number of factors contribute to this comparison including:

The SOFC system efficiency which results in a reduction in fuel consumption

Weight added to the aircraft by the SOFCPU which results in more fuel being burned by the main engines for a given flight.

Changes associated with direct generation of ±270 VDC and in conversion to obtain 120 VAC Reduction in power conversion losses for direct generation of ±270 VDC Increase in losses for 120 VAC (transformer more efficient than inverter)

Reduction in power converter weight

Elimination of the turbine APU weight.

A breakeven weight is defined to be the weight impact at which the additional fuel consumed as a result of the weight addition is equal to the fuel saved due to the higher efficiency of the generating system. The breakeven weight is primarily a function of the SOFCPU efficiency but as will be discussed, also varies with the assumed length of the flight used to determine it.

For operation during weather conditions requiring maximum deicing power, the amount of power drawn from the engine generators is relatively constant over the major portions of the flight. At lower altitudes, greater power is used for ice protection and hydraulics while at higher altitude more power is used for the environmental control system and cabin pressurization. The two effects offset resulting in a relatively constant power output from the engine generators. There are brief periods when the power drops noticeably. For example, when landing gear is retracted the ice protection is turned off briefly resulting in a dip in the load on the engine generator. However, these periods are brief and unlikely to have a noticeable impact on fuel consumption for electrical generation. As a result of the relatively flat power profile it was decided to simplify the analysis by evaluating the electrical generating systems on the electrical loads existing during the cruise condition and then apply that power generation requirement as a constant over the entire period of a flight.

The Boeing 787 electrical generation and conversion efficiencies are significantly higher than earlier non-MEA aircraft. The improvements in efficiency are primarily due to the use of a variable frequency generator and advances in electronics that allow much higher power conversion efficiencies. For example, comparing the 787 to the 777, the efficiency measured at the AC output of the generator is 53% compared to 34% and at the ±270 VDC bus the efficiency is 51% compared to 25%. This improvement in efficiency effectively raises the bar for the performance of fuel cell systems to show benefit on the aircraft.

The Boeing 787 has engine mounted generators that produce a variable frequency 230 VAC output. About 30% of the generated power is used directly, but to satisfy the largest loads the AC power is converted to ±270 VDC in an autotransformer rectifier unit (ATRU) with 97% efficiency. Power is also converted to 115 VAC 400 Hz in a 98% efficient transformer and to 28 VDC in an 80% efficient transformer rectifier unit (TRU).

For the SOFC electrical system, the distribution system was modified so that the SOFC directly produces ±270 VDC. The present design does not include regulation of the ±270 VDC power and some additional losses may occur if tight regulation on the voltage is necessary. The 230 VAC loads are moved to ±270 VDC bus and DC/AC and DC/DC power converters with an efficiency of 80% are used to provide power to 115 VAC and 28 VDC loads. The selection of 80% efficiency for DC/AC and DC/DC conversions was in line with the initially provided Boeing 777 converter efficiencies. In light of the 97% efficiency being achieved in the 787 ATRU, future analyses should examine whether higher efficiency is possible for the DC/AC and DC/DC converters used when implementing the fuel cell power system.

Due to the SOFC system assuming 80% for DC/AC conversion while the generator based system achieves 97% efficiency for the transformer AC/AC conversion, the SOFC system must generate slightly more power (972 kW) than the generator system (944 kW). Prior to correcting the Boeing 787 input data the estimated power for the SOFC system was 821 kW. As a result, this is the power level selected for the more detailed SOFC design exercise. In addition, the change to direct generation of DC eliminates the ATRU and eliminates the 235 VAC power distribution bus. The weight saved in power conversion equipment is estimated to be 266 kg. This savings is based on weight per unit power output values summarized in Table 2.1. Most specific weight factors were based on a fairly close match to equipment designed for aircraft.

In certain embodiment, the SOFC system may be placed in a grade 5 titanium pressure shell designed for a safety factor of 1.5 on yield stress. Other heat exchangers, the anode blower and the reformer were scaled based on an existing SOFC power system operating at 6.29 kW at 0.75V. The weight for the 0.75V case was proportioned based on power level. Adjustments for other voltages were then made by proportioning to the change in air flow or fuel flow as appropriate. Base values are shown in Table 3.

TABLE 3

Base Values for BOP Weights

| Component | Base, kg | Scaling |
|---|---|---|
| Cathode recuperator | 7.912 | ratio to air flow |
| Anode recuperator | 3.33 | ratio to fuel rate |
| Reformer | 4.336 | ratio to fuel rate |
| Anode blower | 6.46 | ratio to fuel rate |

Stacks were estimated at 62 kg/100 cells as discussed above. The preliminary weight estimates do not account for the insulation, connecting pipes, support structure, instrumentation and controls. Table 4 shows a summary of the anode recycle flowsheet cases efficiencies and system masses for major components.

TABLE 4

Estimated Net Efficiency and Weight Added to Aircraft by SOFCPU Scaled to 972 kW (kg)

| | SOFC Cell Voltage | | | | |
|---|---|---|---|---|---|
| Pressure | 0.850 | 0.825 | 0.800 | 0.750 | 0.700 |
| 0.8 atm | 75%/10690 | 73%/7631 | 71%/6320 | 68%/5291 | 64%/5022 |
| 1.5 atm | 76%/7698 | 73%/6120 | 71%/5379 | 67%/4813 | 63%/4739 |
| 3.0 atm | 75%/5837 | 73%/5069 | 70%/4709 | 66%/4509 | 61%/4630 |
| 5.5 atm | 74%/4867 | 72%/4498 | 69%/4355 | 63%/4397 | 57%/4719 |
| 8.0 atm | 73%/4485 | 70%/4287 | 67%/4250 | 60%/4507 | 53%/4990 |

As the operating pressure is increased the efficiency declines due to a reduction in the amount of power obtained from the compressor/expander, partially offset by a reduction in parasitic power for anode recycle. On the other hand, the weight impact decreases with higher pressure due to a reduction in the stack weight. At pressures of 1.5 atm or less the weight impact monotonically increases as the voltage is increased due to the increase in stack size. However, at higher pressures the weight decreases as voltage is increased, reaching a minimum at a cell voltage which increases with increasing pressure. This occurs because at high pressure and low voltage the compressor must be driven electrically rather than yielding power. This in turn requires a higher gross power be produced requiring a larger stack. The minimum in the weight impact curve occurs close to the point where the compressor expander power has a small positive balance such that only a small amount of power is produced but no electrical power input is required.

The weight distribution (normalized to 100% total) of the SOFC system shifts significantly between the stack and the key balance of plant items (heat exchangers, anode blower, reformer) as the cell voltage is lowered. This is primarily driven by a reduction in the size and weight of the stack with some increase in cathode recuperator needed to handle higher air circulation rates needed to cool the stack at lower voltages. At high pressure, the impact of the stack weight is significantly reduced due to the increase in stack performance at higher pressure. In the current methodology the weight of the compressor/expander and vessel are minor contributors to the overall system weight.

The existing engine generators increase fuel burn by 141.4 kg/h to produce 944 kW at 53% efficiency evaluated at the 230 VAC bus. The DC power system produces 972 kWe to the ±270 V bus. The mass rate of fuel savings depends on the SOFCPU efficiency. Table 5 provides the mass rate of fuel savings for electrical generation prior to taking into account increases in main engine fuel consumption resulting from increases in aircraft weight.

TABLE 5

Mass Rate of Fuel Savings for Electrical Generation. Does not include effect of SOFCPU mass.

| Efficiency | Fuel Burn Rate in SOFCPU, kg/h | Fuel Savings for Electrical Generation over Engine Generators, kg/h |
|---|---|---|
| 80% | 99 | 42 |
| 75% | 106 | 36 |
| 70% | 113 | 28 |

TABLE 5-continued

Mass Rate of Fuel Savings for Electrical Generation.
Does not include effect of SOFCPU mass.

| Efficiency | Fuel Burn Rate in SOFCPU, kg/h | Fuel Savings for Electrical Generation over Engine Generators, kg/h |
|---|---|---|
| 65% | 122 | 19 |
| 60% | 132 | 9 |

The Piano-X model of the Boeing 787-8 was used to assess the fuel consumption impact of adding weight to the aircraft. Flight distances of 1000, 3000, 5000 and 7000 nautical miles were simulated. For each flight distance the weight sensitivity was assessed by calculating the fuel consumption for a light, medium and heavy payload range. The light payload was determined as 242 passengers×95.3 kg=~23,000 kg. This represents an aircraft carrying a load of passengers but negligible additional cargo. The payload was then increased in 1000 kg increments to determine fuel consumption for payloads between 23,000 and 28,000 kg. For a medium payload range, payloads ~50% higher were assessed. Fuel consumption rates for payloads between 34,000 and 38,000 kg were calculated. To define a heavy payload range, the operating empty weight is subtracted from the maximum landing weight of 16,782 kg to determine a maximum payload of 53297 kg with zero weight of fuel. This defines the highest payload with which the aircraft can safely land. Steps are taken over a range of 47,000 to 53,000 kg payload. For each simulation, the aircraft climbs to cruising altitude and cruises at Mach 0.85. However, the Piano-X model was allowed to select the numerous flight parameters that affect the overall fuel consumption, including factors such as the aircraft speed and rate of climb to cruising altitude, the initial cruise altitude, the aircraft speed and rate of descent at the end of flight, and the appropriate weight of fuel including reserve fuel. For example, the altitude for most efficient steady state cruise varies with aircraft weight. A lightly loaded 787 cruises most efficiently at ~43,000 ft while a heavily loaded aircraft cruises more efficiently at ~37,000 ft.

For each specified flight distance and payload the Piano-X model selects the flight parameters and calculates the fuel consumption. As the model responds to different flight distances and payloads it makes discrete step changes in the flight profile to remain within the capability of the aircraft and preserve efficiency. For example, for a 1000 nm flight the model changes the selection of initial cruise altitude from 43,000 ft to 39,000 ft at a payload of 38,000 kg. This creates a corresponding noncontinuous shift in fuel consumption rate as payload is varied. The impact of these discrete steps is minimized by examining the payload to fuel relationship over a broad range of payloads.

Fuel consumption is expressed as kg per 1000 nm in order to compare different trip lengths. At flight distances of 1000 nm and 3000 nm, the impact of an added kg of weight is to burn an additional 0.053 kg of fuel per 1000 nm of trip. Overall fuel efficiency for the 3000 nm trip is higher because a greater proportion of the trip is at cruise altitude where the aircraft is more efficient. At 5000 nm and 7000 nm the overall fuel efficiency declines relative to 3000 nm and the impact of an added kg of weight increases. The reduced efficiency is the result of the requirement to carry a heavier fuel load during early portions of the flight. Similarly, the increased impact for changes in aircraft weight is due to the fact that if fuel consumption goes up due to an increase in aircraft weight the fuel consumption increases by an additional increment in order to accommodate the additional fuel weight being carried. This effect is less important for shorter flights but becomes more important for longer flights.

Incorporating the SOFC power system will increase the aircraft weight by an amount equal to the weight of the hardware added minus any equipment (such as the turbine APU) which is eliminated. A breakeven weight is defined to be the weight impact at which the additional fuel consumed as a result of the weight addition is equal to the fuel saved due to the higher efficiency of the generating system. With a constant rate of electrical generation the fuel saved per unit time is constant throughout the flight. However, the impact of added aircraft weight on fuel burn rate varies with the aircraft operating condition. During the climb and descent phases of a flight the average velocity is about approximately three-quarters the velocity during cruise. For flights up to 5000 nm, the average impact of an added kilogram of aircraft weight on fuel burn rate (i.e., kg/h increase in fuel burn per added kg of aircraft mass) is about 22% to 32% greater in cruise than the average of climb and descent 1. Thus, for the climb and descent phases the aircraft weight at which fuel consumption will be equal is higher than the equivalent value at cruise. As a result, shorter flights which have a shorter duration cruise segment have higher overall breakeven weights. A constant electrical generation rate results in more fuel being burned per mile to generate electricity during the climb and cruise segments of the flight while the aircraft velocity is lower. This relationship exists for the engine generators as well as the SOFC. For a given efficiency difference between the SOFC and engine generator, the fuel savings per mile will be greater for a shorter flight with a lower overall average velocity. Also, the total time over which electrical power is generated includes taxi time during which fuel is burned for electrical generation but distance is not achieved.

The overall optimum performance condition occurs at 8 atm and 0.825 V. However, the 5 atm and 0.80 V/cell is nearly as good.

The preliminary calculations suggest that the conditions that will come closest to achieving the breakeven weight are about 8 atm and 0.825 V per cell. In order to take credit for elimination of the Turbine APU the SOFC power generation is separated into three independent systems, each contained in its own pressure vessel with its own compressor/expander. This provides redundancy, making it unlikely that a single failure could result in a critical loss of electrical generation capacity. The layout for the system is shown in FIG. 2.

The design of the system was completed based on a gross DC output of 821 kW. Based on corrections to the 787 electrical system efficiency inputs it is expected that the actual power output would need to be approximately 972 kW. Rather than redesign the system to accommodate the higher power level, the power density of the 821 kW system will be assumed to be representative and linearly scaled to estimate the weight of the 972 kW system (i.e. multiplied by 972/821=1.18).

Detailed calculations were performed to assure adequate flow distribution could be obtained within the SOFC stacks. The higher power density, the increase in active area, and the increase to 109 cells all act to increase the molar flow of gas in the stack headers. However, operating at 8 atm reduces the velocity of gases in the headers which reduces the pressure variations that lead to flow mal-distribution. The higher pressure also lowers the velocity in the active area of the stack which reduces the pressure drop across the cells, and it is the pressure drop across the cells that acts to even out the flow distribution.

In order to get an acceptable flow distribution the pressure drop across the cell was increased significantly for both the anode and cathode flow channels to provide a total static pressure drop across the cell of 24 in. water. The sizes of the anode and cathode headers within the cassettes were then adjusted within the space available to optimize the flow distribution. The final flow distribution was well within criteria for adequate flow distribution. Leveling the flow through an increase in stack pressure drop was judged to be preferable to expanding the stack frame to accommodate larger headers which would have increased the weight.

The stack frame is similar to the Delphi Gen4 stack. The major difference in weight is related to stretching the dimension in the flow dimension in order to accommodate an increase in the flow distance over active area by 36%. This increases the cassette dimension in the flow direction from 9.451 in. to 11.578 in. The weight per cell increase due to the stretch is 620 g to 759.5 g. The weight of a bare stack is then 759.5*109=82.8 kg.

In addition to the cells, a load frame was added to the stack. The purpose of the load frame is to maintain the stack under compression at all times to protect the seals within the stack. The load frame serves a dual purpose of holding the header connections onto the top and bottom of the stack. Both the header boxes and load frame are electrically isolated from the stack itself through non-conductive gaskets. The load frame and header connection boxes are expected to add 13 kg to the stack weight resulting in an overall stack weight of 95.8 kg. Dimensions of an assembled 109 cell stack are 12.613 in. W×11.578 in. L×11.049 in. H. Header connections connect anode to one end of stack and cathode to other end with headers distributing flow in a "U" configuration for both sides.

Due to the need to separate the generating system into three independent systems, each with a dedicated compressor/expander, the desired compressor must be scaled down by a factor of 3 in air flow relative to the Williams WR2. At the same time, the compression ratio must be increased from 4.2 to about 28.6 meaning several stages of compression would be required. Increasing the compression ratio is achieved by adding successive stages of compression to the shaft. In order to address the question of whether efficiency can be maintained as the scale is reduced, the thrust specific fuel consumption of smaller jet engines was examined.

At sea level, the Willams WR2 generates 125 lbf of thrust at a fuel consumption rate of 1.25 lb/h per lbf of thrust. An engine generating 45 lbf of thrust at thrust specific fuel consumption of 1.50 lb/h per lbf has been developed by Ewald Schuster. This engine moves 0.372 kg/s air at a pressure ratio of 3.5 while turning 100,000 rpm and weighs 6.5 lb. JetCat USA makes a number of smaller jet engines intended for large scale model aircraft with thrust capability between 13 and 45 lbf3. The model P120SX engine generates 30 lbf thrust or about one-quarter the thrust of the Williams WR2 with a thrust specific fuel consumption of 1.50 lb/h per lbf similar to the Schuster engine. Hence, fuel consumption per unit thrust for these two engines increases by 20% (1.50/1.25=1.20) when scale is reduced by a factor of 3 to 4. It is difficult to determine the degree to which this reduction in efficiency is the result of scale and the degree to which other design factors may affect the engine efficiency. Factors other than scale are likely since Williams produces engines for military applications while the smaller engines are targeted at hobbyist projects. However, it does appear it is possible to maintain reasonable efficiency when scaling down to the degree needed to split the air compression into three independent systems.

For purposes of the scaled design the JetCatP-200 engine was used as the basis for size and mass. This engine is 5.2 in. in diameter, weighs 5 lbs, and generates 52 lb thrust at 112,000 rpm. The length was stretched and the mass tripled to account for the need for three compression stages. This provides a total weight of 6.8 kg. In addition to scaling to the desired airflow, the compressor/expander faces a challenge in that it is desired to maintain a constant SOFC pressure regardless of the static pressure, relative velocity and temperature of air outside the aircraft.

The main aircraft engines face a similar challenge in that they must operate over a range of altitudes and velocities which varies the inlet temperature and inlet/outlet pressures. The challenge differs in that the SOFC compressor will need to operate at nearly constant compressor outlet pressure over a smaller range of air flows while the engine may not need constant compressor outlet pressure but needs to operate over a wide range of air flows ranging from high rates for takeoff and climbing to low rates while idling. Axial compressors on aircraft engines use some combination of bleed valves and variable stator vanes to allow operation over a wide range air flowrates as well as over a range of air intake and exhaust pressure conditions. Bleed valves allow air from the compressor stages to be released. Variable stators pivot to alter the amount of air being compressed. These measures are necessary to prevent a surge condition in which flow reversal in the compressor causes unstable operation. Similar measures may be required for the compressor/expander designed for the SOFCPU in order to provide the desired flowrate of air at a constant controlled pressure while the aircraft operates at different altitudes.

The speed control of the SOFCPU compressor expander will be accomplished using a motor-generator that will convert excess power to electrical energy, or under conditions where more shaft power is needed, convert electrical energy into shaft power. If needed, pressure control could be improved by placing compression and expansion turbines on separate spools with each tied to a motor generator. The compressor would then be linked to the expander via an electrical link between the motor generators allowing the compressor and expander shafts to operate at different velocities. Alternatively, this might be done only with one compressor and one expander stage in order to minimize efficiency losses associated with the electronic link. Electronically linking the compressor and expander is similar to an approach being investigated for automotive turbo-chargers.1 In the case of the turbo-charger the objective is to allow the boost pressure to rise before the energy is available in the exhaust, eliminating the lag in turbo power.

In the event the compressor cannot maintain 8 atm in the SOFC there would be an option to reduce the voltage in the SOFC in order to increase power when pressure is low. However, this is undesirable as it would reduce the SOFC efficiency and introduce additional losses due to the need to provide DC/DC conversion to restore the ±270 VDC bus voltage. Finally, it may be necessary to either coat chrome containing metal alloy surfaces in the compressor, or make the parts from an alloy that either forms a non-chromia surface or does not contain chrome in order to prevent chrome volatility and resulting poisoning of the fuel cell cathode. If the compressor itself is fabricated in titanium this would eliminate concern over chrome volatility. Chrome volatility is a greater concern in the cathode recuperator and the issue is discussed further in that section.

The operation of the SOFC compressor/expander is conceptually similar to a turbo charger on an internal combustion engine. In each case, air is compressed, used for combustion and hot exhaust gases are expanded to recover mechanical energy to drive the compressor. In the turbocharger a cooled charge is delivered to the engine (using a charge cooler) while in the SOFC and jet engine application it is desired to maintain the temperature of the compressed gas to improve efficiency. Most automotive turbocharger compressors are made in aluminum alloy due to the moderate level of compression (and corresponding temperatures) being achieved. Higher performance turbo chargers use titanium compressors to improve strength at high temperature. For the SOFC compressor-expander, the compressed air is expected to be on the order of 500° C. meaning aluminum compressor materials would not be compatible. While materials issues could be avoided by cooling between multiple compression stages this would also cool the exhaust gases via a reduction in the temperature at the cold end of the recuperator and would adversely affect the power obtained from the expander.

Despite these differences, the comparison to a turbo charger may be useful from the standpoint of confirming the approximate size of equipment required. In addition to requiring a higher compression ratio than achievable in a single stage turbocharger, the design of the SOFC system compressor-expander is complicated by the fact that it must operate both under conditions at sea level and at cruise altitude. This implies it must have a different compression ratio at cruise altitude than it does on the ground. Prior to takeoff, the air inlet is at the ambient ground temperature and both inlet and outlet are at ~1 atm. Cruising at Mach 0.85 at 40,000 ft the inlet pressure is estimated to be at about2 0.28 atm and −30° C. while the exhaust exits to a pressure of 0.185 atm. The desired compression ratio at 40,000 ft is 8/0.28=28.6 while at ground level a compression ratio of 8/1=8 is desired.

Single stage turbocharger pressure ratios top out in the 4 to 5 range with some turbochargers designed for very large diesel engines being capable of pressure ratios up to 5.25. To achieve a pressure ratio of 28.6 multiple stages of compression would be required. About three stages of turbo charging operating at a pressure ratio of 3.057 would provide approximately the appropriate compression at cruise altitude (i.e., 0.28 atm×(3.057)^3=8 atm). At atmospheric pressure, a compression ratio per stage of about 2.0 would be desired (1 atm×2.0^3=8 atm). The system has an air flow of about 50 lb/min.

Variation in compression ratio can be achieved by varying the turbo speed. It is envisioned that each compressor expander stage would be installed on a shaft with an electric motor generator which would be used to control the shaft speed.

The approach to speed control is similar to a new turbocharging technology being developed for automotive applications in which each the expander and compressor are electronically rather than mechanically linked. Applying this approach to an axial compressor such as the miniature jet engine would provide the added flexibility in that the speed of the compressor and expander would not need to match, making precise control of the SOFC pressure more straight forward under transient conditions.

At an operating pressure of 8 atm, efficiency of the axial compressor will be a key to achieving efficient operation of the SOFC power system. Modeling of the system assumed 80% efficiency in the compressor based on the Williams WR2 jet engine compressor which achieved a pressure ratio of 4.1. Typical aviation axial compressors have pressure ratios per stage of 1.15 to 1.6 and exhibit efficiencies of 80 to 85%. There do not appear to be examples of multi-stage axial compressors in the desired size range. The Williams WR2 compressor as well as typical turbochargers have a radial or centrifugal blade exit which compared to an axial flow arrangement may introduce a larger increment in size per additional stage as well as a greater flow loss between stages making it harder to maintain efficiency. Similar concerns apply to the expansion section. Designing for more than one operating point presents an additional challenge. The efficiency of the turbocharger shown above approaches the assumed 80% value used in modeling at maximum efficiency but is only about 75% at the selected operating points. Presumably, a compressor would be designed for maximum efficiency at cruise condition and would then need to accept a slightly lower efficiency when operating at other compression ratio conditions.

The compressor/expander is located primarily inside the pressure shell with the inlet and exhaust lines penetrating the pressure shell. This allows the gas temperatures at the point where the penetration of the pressure shell occurs to be compatible with the titanium pressure shell. The exhaust gases are reduced to ~250° C. during the expansion. However, the turbo-compressor/expander is expected to operate at high rpm (in the neighborhood of 100,000 rpm), and while the service interval is not determined, it is likely to be the most demanding component in terms of maintenance. Other mechanical components include the fuel pump located outside the pressure shell and the anode recycle pump which is inside the pressure shell but operates at a lower speed and lower pressure ratio compared to the compressor expander. Because it is inconvenient to open the entire pressure vessel cross section to perform maintenance, it may be desired to move the turbine outside the pressure shell. Moving the turbine outside the pressure shell will require careful consideration of the high temperature (740° C.) combustion exhaust line as it passes through the pressure vessel. The compressed gas from the turbine at ~500° C. is also a concern.

The assumed alloy of the vessel Ti-6Al-4V is typically applied only up to ~350° C. The highest temperature Ti alloys offer useful maximum temperatures up to about 600° C. (Gogia 2005). Hence the vessel wall in the region of the penetrations will need to be protected from high temperatures or the alloy changed to a high temperature alloy such as Inconel. Titanium can safely be connected to metals with higher temperature capability such as Inconel 625.1 so it is also possible to transition between Inconel and titanium.

The cathode recuperator takes air from the outlet of the compressor and preheats it to 700° C. using the 800° C. exhaust gases. The heat exchanger may be produced from a stack of sheet metal pieces which have been photo-chemically etched and then diffusion bonded to form laminar flow heat transfer channels. This design approach allows a highly compact heat exchanger with low pressure drop to be produced. The design benefits from the 8 atm operating pressure which reduces pressure drop and allows smaller channel heights to be used resulting in a more compact device with higher heat transfer coefficients. Since the heat exchanger is maintained within a pressurized shell at ~8 atm and the two sides of the heat exchanger are at similar pressures the heat exchanger does not have to withstand high differential pressures.

Use of stainless steels or nickel-based alloys containing chrome in the high temperature portions of the air inlet to the cathode presents an issue related to cathode poisoning due to volatility of chrome (Yang et al. 2005, Simner et al. 2001). The volatility of chrome in the presence of moisture and oxidizing conditions has been examined as a function of temperature by Gindorf et al. (2005). In order to avoid fuel cell degradation due to chrome volatility, the cathode recuperator and ducting leading from the cathode recuperator to the fuel cell are proposed to be fabricated in Haynes 214 alloy. When heated, the Haynes 214 alloy forms an alumina scale which limits the volatility of chrome into the gas stream. This approach is believed to be more straightforward than the alternative approach of coating all exposed surfaces due to the large amount of exposed area within the cathode recuperator.

The recuperator may be constructed from 0.041-inch thick Haynes 214 sheet metal. The metal is etched from each side to a depth of 0.0155" in regions where flow channels are desired. The sheets are then stacked so that etched areas line up to create 0.031" high flow channels separated by 0.010-inch thick walls. A total of 124 sheets are required to provide the target performance. Endplates are placed on the top and bottom to facilitate diffusion bonding of the sheets to form the exchanger as well as to allow welding to the top and bottom without risk of damage to the diffusion bonded stack. Flow in the heat transfer zone of the exchanger is laminar and counter-current. Of the total length, 8 inches is dedicated to counter-current heat transfer while 3 inches on either end is dedicated to headers to allow incoming gases to distribute evenly between the various channels. The exhaust gases enter and exit the ends of the heat exchanger while the incoming air enters and leaves the exchanger from the top and bottom. Excluding the external header attachments the heat exchanger block measures 14.2 in. L×5.2 in. H×10 in. W. Prior to installation the heat exchanger is oxidized to grow an alumina scale on the surface. As discussed above, the alumina scale is required to prevent volatility of chrome from the exchanger surfaces which would poison the fuel cell cathode and result in degraded performance.

The cathode recuperator is designed to provide the preheated air stream at a temperature of 700° C. while the cathode exhaust is at 800° C. The effectiveness of the exchanger is 70.2%. This is somewhat different than the similar recuperator for atmospheric systems which must be on the order of 90% effectiveness because the recuperator receives air preheated by the compression operation. The total of pressure drop through the hot and cold sides of the exchanger is estimated to be 16 inches of water. Some additional pressure drop may be seen in header transitions. Overall pressure drop including header transitions is estimated to be on the order of 20 in. of water.

The burner size is estimated based on an axial flow of 20 m/s and a length to diameter ratio of 2:1 which results in a combustion chamber measuring 9 inches long×4.5 inches inside diameter. The axial velocity was selected by analogy to other combustors. The reduction in flame speed expected due to the relatively low quality of the fuel roughly offset the increase associated with the high inlet temperature. The walls of the burner are assumed to be constructed using Inconel 625.

The fuel for the SOFCPU is assumed to be either a synthetic Fischer-Tropsch liquid fuel with properties similar to jet fuel or a deeply desulfurized jet fuel (e.g, less than 50 ppbw sulfur). The fuel is assumed to be loaded into a dedicated tank that is maintained separate from the jet fuel used for the main engines. Avoiding sulfur contamination in the fuel fed to the SOFC power system is critical because the sulfur is a poison for both the reformer catalyst and the fuel cell anode (Rasmussen et al. 2009, Kishimoto et al. 2010). Attempting to operate the SOFC power system with conventional jet fuel would result in a rapid reduction in both the ability to reform the fuel (possibly leading to hydrocarbon breakthrough and initiation of coking of the unreformed fuel within the SOFC) as well as the ability to produce power from the stacks.

In the current estimate, weight is included for the fuel pump but changes in weight related to the fuel tanks is not included. Ultimately, if the SOFC power system results in a reduction in fuel consumption, the main fuel tanks may become slightly smaller but require a partition to handle a separate fuel. The overall weight impact on the tanks is not clear. It is assumed the existing system used to produce reduced O2 air for the head space in the fuel tanks would be adequate for the new two fuel tank system.

The fuel pump is located outside the pressure vessel. As a result, the fuel pump must be able to pressurize the fuel to the pressure vessel pressure of 8 atm absolute (~118 psia) plus provide the back pressure created by flow. A fuel flow rate of 70 lb/h (~662 ml/min) is required. The fuel pump is assumed to consist of three MZR-7205 micro-annular gear pumps operating in parallel. Each pump is capable of 288 ml/min meaning three pumps in parallel have more than enough volume capacity. The pressure capacity is 40 bar or about 4 times what is necessary. The maximum power is 44 W per pump for a total parasitic draw of 132 W per system. This amounts to about 0.05% of the net power making it negligible. Each pump including an integral controller weighs 1.08 kg for a total weight of 3.24 kg per system. The three pumps per system approach would provide a degree of redundancy on fuel delivery, preventing a single pump failure from shutting down the power system.

The anode recycle pump receives hot (~643° C.) reformate from the adiabatic reformer and pumps reformate to the fuel cell anode. The overall pressure rise across the blower is assumed to be 33 in. of water. Of this rise, 24 in. is due to the pressure drop across the stack which is intentionally increased by a factor of ~4 in order to improve flow distribution. The remaining 9 in. is to allow for a small pressure drop in the steam reformer plus a pressure drop allowance to account for pressure drops for flow through ducts were not determined. Pressure across the blower is assumed to be 7.985 atm at the inlet and 8.056 atm at the outlet. Due to the elevated pressure, the pressure ratio across the blower is a very low value of ~1.01.

The estimate of the size and mass of the blower was based on scaling an R&D Dynamics Centair S1244. The S1244 is an anode gas recycle blower with a maximum inlet temperature of 750° C. It is powered by a permanent magnet BLDC motor and uses high speed foil gas bearings. The blower design provides for thermal isolation between the motor and the process stream which results in the blower being heavier than an equivalent low temperature blower.

Because the inlet pressure is about 8 atm, the pressure ratio for the blower is very low (~1.01). Based on the gas inlet temperature, pressure, composition and pressure ratio, it is estimated that about 4 of the S1244 blowers would be required to meet the required flow of one SOFC power system. Rather than design with 4 separate blowers in parallel, the mass was estimated to be a factor of 4 higher than a single blower for a mass of 20.88 kg.

The dimensions of the blower were increased in constant proportion of 1.587× to arrive at a blower volume which is 4× that of a single blower1. The S1244 is equipped with fins that enable air-cooling of the motor. It is assumed that these fins are removed and a liquid cooling jacket is provided with 2 inches of microtherm super-G insulation surrounding the motor to limit heat leak into the motor. The fins and the liquid jacket and tubes are assumed to offset in terms of weight impact and the weight of the insulation is estimated to add approximately 2.22 kg while the thickness of the insulation adds to the dimensions.

The blower requires a controller and on the aircraft it would be preferable to operate on DC power. The controller offered with the original S1244 is designed to operate on 110 V AC so the controller weight was based on other DC supplied BLDC motor controllers. The power capacity for the controller was set to 50% greater than the steady state blower power required. This resulted in a controller weight of 1.81 kg. The controller is assumed to be located outside the pressure vessel. The masses associated with the anode recycle blower are summarized below for one system:

Blower 20.88 kg
Insulation 2.22 kg
Controller 1.81 kg
Total 25.3 kg.

The total weight for three independent systems is then 75.9 kg.

The components were modeled in three dimensions and fit into a pressure vessel in order to improve the fidelity of the weight estimates. A structure inside the insulation was added and brackets to support the stacks were added. Ducting to convey gases between components were included. One-quarter in. of insulation was added to primary cathode and anode inlet/outlet ducts. Other ducts and surfaces are currently not insulated. The physical layout of the system is illustrated in FIGS. 3-5. The exterior dimensions on the vessel are a diameter of 25.5 in. with a straight wall length on the cylinder of 104 in. The overall length including hemispherical ends is 129.5 in. The weight distribution from the Solidworks model of the system is summarized in Table 5. It is notable that the overall weight is dominated by the stacks, insulated pressure shell, and main stack header ducts. These components account for 85% of the mass of the overall system.

TABLE 5

Single Power System Weight Distribution
(three systems required for aircraft)

| Component in Assembly | Mass, kg | wt % |
|---|---|---|
| Stack and Frame | 581.6 | 62.0% |
| Shell and Insulation | 135.9 | 14.5% |
| Main Fuel Cell Headers and Insulation | 80.3 | 8.6% |
| Cathode Recuperator | 43.9 | 4.7% |
| Support Frame and Brackets | 34.1 | 3.6% |
| Anode Blower | 23.5 | 2.5% |
| Steam Reformer | 18.7 | 2.0% |
| Compressor/Expander | 6.8 | 0.7% |
| Combustor | 1.3 | 0.1% |
| Other Ducts and Misc. | 12.4 | 1.3% |

The weight impact to the aircraft would need to include three independent systems and need to account for the mass removed from the aircraft. The weight impact to the aircraft is:

SOFCPU (821 kW) 2815
SOFCPU (972 kW proportionally scaled) 3333
Removal of Turbine APU—245
Reduction in Converter weight—266
Net Impact to aircraft weight (972 kW) 2822 kg.

The system mass estimate based on the Solidworks model is significantly less than the initial scoping estimate of 4287 kg for the 8 atm, 0.825V/cell case (see section 2.3). There are several key factors that contribute to the reduction in weight, primarily having to do with the balance of plant component weights, including It was decided to use a high temperature anode blower capable of operating on the reformer outlet gas directly. This eliminated the anode recuperator which was included in the system used to make initial weight estimates.

The operation at 8 atm has two impacts on the cathode recuperator. First, the pressure drop for flow is much less for the pressurized gas, allowing smaller channels with higher heat transfer coefficients to be used in the design. In addition, the incoming air is preheated to ~500° C. by the compression operation reducing the duty and effectiveness required of the exchanger to preheat the cathode air to 700° C.

The elevated pressure increases methane formation in the steam reformer which keeps the temperature higher and kinetics faster. Also, as the reformer is scaled up, the relative mass of catalyst foam relative to the reformer shell increases.

The weight per unit output on the anode blower scales favorably and the fact that the anode gas is pressurized greatly reduces the mass of the blower required to circulate the anode gas through the system.

Table 6 provides details of the reductions in the mass estimates for balance of plant components in the final 8 atm design. The savings obtained in these BOP components more than offset the increase due to ducting, structure and other items being added.

TABLE 6

Comparison of Several BOP Component Weights:
Preliminary Estimate vs. Conceptual Design (conceptual design
weights at 821 kW scaled linearly to 972 kW)

| BOP Component | Preliminary Calculation, kg 3 times the single system component weights, | Conceptual Design, kg |
|---|---|---|
| Cathode Recuperator | 771.1 | 155.9 |
| Anode Recuperator | 435.3 | 0 |
| Steam Reformer | 566.8 | 65.4 |
| Anode Blower | 844.4 | 83.5 |

Although the conceptual design represents a significant improvement relative to initial scoping estimates there are still several areas where increases in weight or reductions in efficiency could occur as the design becomes more complete.

The final pressure shell will likely be heavier than currently estimated. The exterior shell is currently designed only for pressure stresses and does not include a flange or other closure to allow access to the vessel interior for maintenance. Weight will need to be added to the vessel to handle stresses occurring as the system weight is transferred to the aircraft structure. Also, as currently drawn there is no firm connection between the interior frame and the external shell and some firm structure may be needed.

The scaling for the compressor/expander and the ability to maintain efficiency and reliability when going to higher compression ratios needs to be confirmed. Also, the ability to construct a compressor expander that will maintain efficiency over the range of inlet and outlet pressures that will be encountered will need to be confirmed. Reliability and maintenance interval for a small diameter compressor/expander is also a potential concern due to the very high rotational speed required in the device.

The current design does not show the electrical connections and the penetration of the pressure shell to bring the power cables out of the vessel. This will have a minor impact on the weight although cooling at the penetration point may be required to prevent local shell overheating due to thermal conduction along the electrical conductor. In addition the current system does not include electrical startup heaters that are expected to be needed to bring the stacks to operating temperature. Space is currently reserved on the side of the stacks opposite the reformer to allow routing of power cables.

The interior of the vessel is envisioned to run at high temperature so insulation is not required inside the primary shell insulation to reduce heat loss. However, some additional insulation to avoid thermal transfer between components might ultimately be required in some areas. Most likely this would take the form of relatively low density batting or lightweight radiation shields between components to reduce the thermal transfer.

The cathode recuperator header connection arrangement used in the assembly differs from the original header design. The modified header arrangement needs to be evaluated for flow distribution. If an acceptable distribution cannot be obtained for the arrangement shown it may be necessary to expand the headers or rearrange the piping to use the initially intended header arrangement. The primary impact would be if the overall vessel needed to stretch in order to accommodate an arrangement that was not as tightly integrated.

The 787 has two 135 gal potable water tanks for a total potable water capacity of 270 gal (1022 liters). The water is UV treated during the loading onto the aircraft. If completely filled the potable water represents a weight of 1019 kg. If water could be recovered from the SOFCPU exhaust at a rate exceeding 100 kg/h and used as potable water it might significantly reduce the weight of water that needs to be loaded at the start of a flight.

Figure 6:
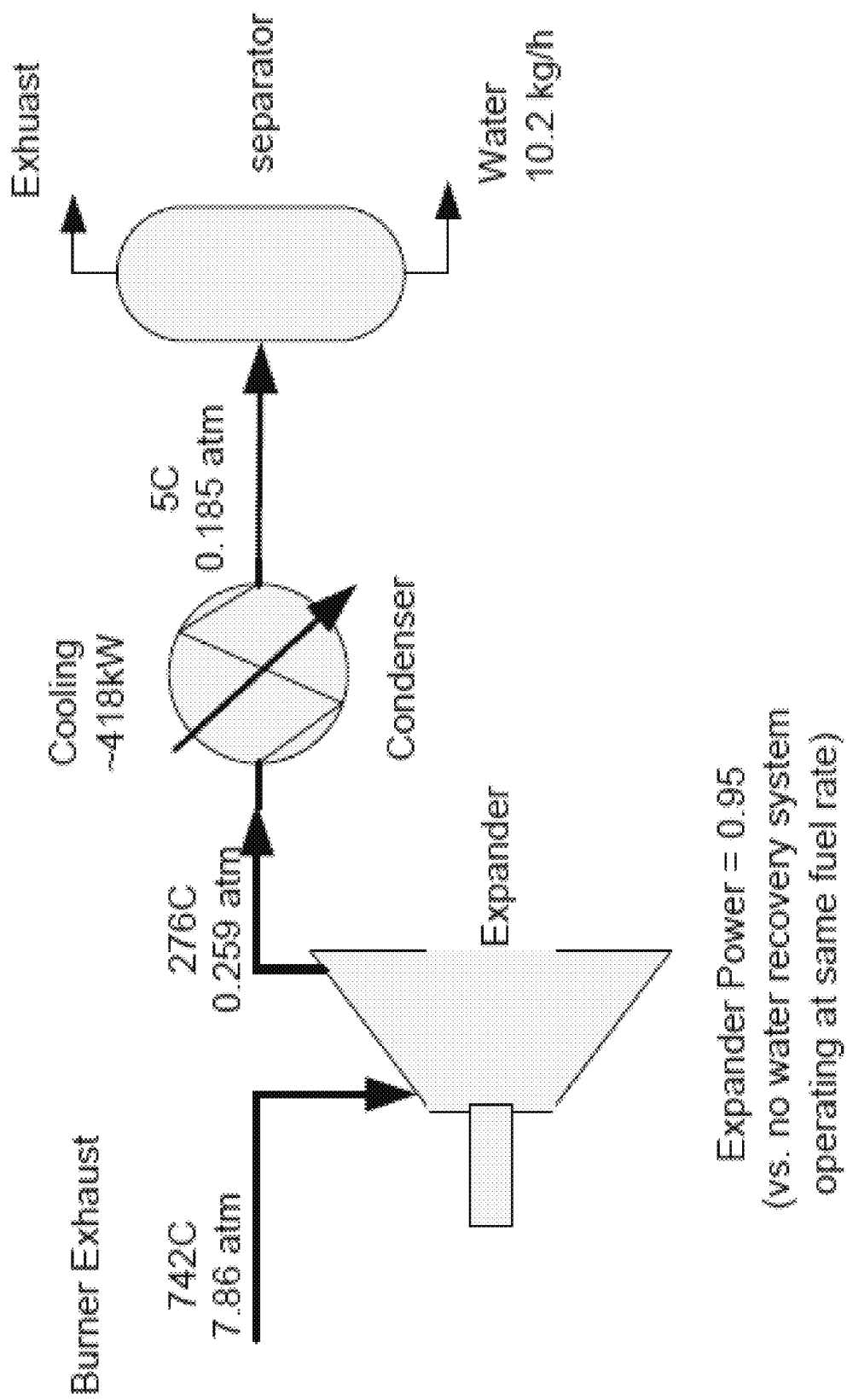
FIG. 6 is a flow diagram showing recovery of water from exhaust after expansion.

In the selected condition (8 atm, 0.825 V/cell), the exhaust stream containing the water vapor is at 742° C., 7.86 atm entering the expander and 251° C., 0.185 atm exiting the expander. Water can be recovered either before or after the expander. The configuration for water recovery after the expander is shown in FIG. 6.

Placement of the condenser downstream from the expansion increases the pressure at the expander outlet, reducing the power from the expander. In this case a 1 psi pressure drop was assumed. The condenser must cool the gas from 276° C. to a temperature near the ice point without plugging the exchanger with ice. Recovery of water at 5° C. is only 10.2 kg/h due to the low pressure downstream of the expander. At 3° C. the recovery can be increased to 29.9 kg/h which is still well short of the desired water recovery of >100 kg/h. However, it would be very difficult to operate this exchanger at 3° C. without forming ice and plugging the exchanger. As a result, the approach of condensing water downstream from the expander may be impractical.

More complicated water recovery approaches might still be practical downstream of the condenser. For example, the water could be intentionally frozen to a surface and then thawed to recover water or a desiccant could be used to recover the water from exhaust and then water recovered by heating the desiccant. However, these approaches were not evaluated.

Figure 7:
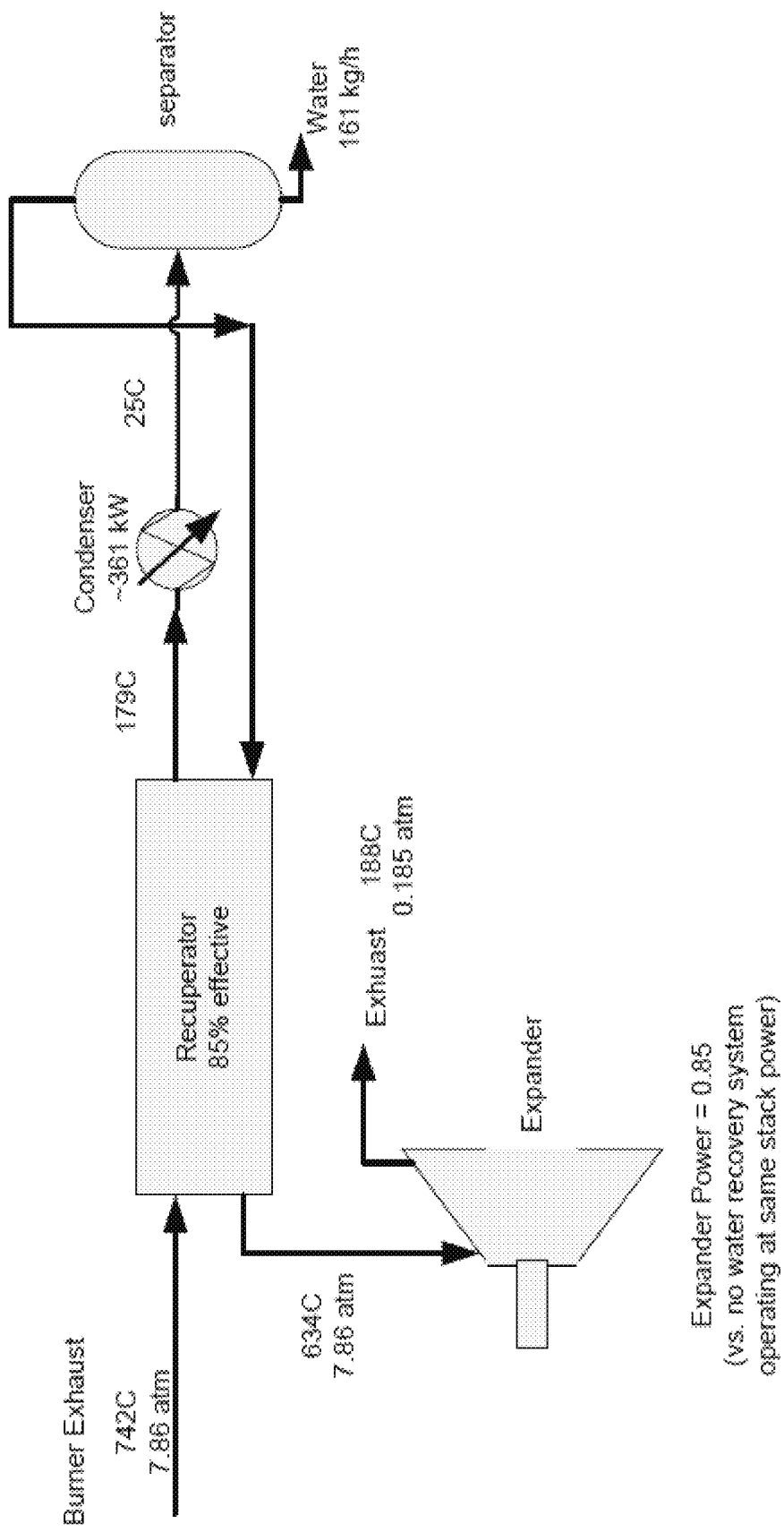
FIG. 7 is a flow diagram showing recovery of water upstream from the expander.

Recovery of water by condensation upstream of the expander is shown in FIG. 7. In this case the gas is cooled in a recuperator before the condenser and after water is separated the gas is reheated in the recuperator to reduce the amount of expander power lost. There would be a pressure drop associated with the recuperator and condenser that would reduce expander power but since the stream is at high pressure the pressure drop will be ignored for the initial analysis. The expander power is reduced by the loss of moles of gas due to water condensation as well as due to a reduction in temperature associated with the assumed recuperator effectiveness of 85%.

The expander power obtained is reduced to only 85% of the power obtained at the same fuel rate and stack power without water recovery while the compressor power is unaffected. In order to maintain an output of 972 kW the overall system must be scaled up by 12.7% to provide the additional power to the compressor, increasing the system mass. Neglecting the additional mass of the recuperator and condenser the increased size of the power unit increases the mass by 422 kg. At the same time, the efficiency is reduced from 70.4% to 62.4%, resulting in a decrease in the system weight that must be achieved in order to break even on fuel consumption. The overall impacts to the system weight and breakeven weight are as follows for a 3000 nm flight.

Water Loading Savings—919 kg reduction in initial water weight with no reduction in final water weight. This assumes 100 kg is initially loaded and the remaining 919 kg is recovered from SOFCPU exhaust. As water is used, it ends up in the greywater storage tank regardless of source so at the end of flight the water amounts will be the same. This might be averaged to about 919/2=460 kg average weight reduction. This may overstate the savings since the tank may only be filled about half full for a 3000 nm flight since the maximum range of the aircraft is over 7500 nm.

Increase in SOFCPU Mass—After renormalizing the system to 972 kWe net power the weight increases by 422 kg. This is driven primarily by an increase in the stack weight and supporting components required to make up for the loss in expander power.

Decrease in Breakeven Weight—The overall system efficiency is estimated to drop from 70.4% to 62.4% which reduces the extent of fuel savings and reduces the mass of the system for which overall fuel savings approach zero. The breakeven weight is reduced from 1191 kg to 591 kg due to the reduction in efficiency which represents a reduction of 600 kg. Stated another way, the allowable weight at which the system would save fuel is cut in half.

Hence, at this point, the overall benefit analysis for a long distance flight is Benefit: 460 kg reduction in average potable water tank content weight Cost: 422 kg increase in SOFCPU mass, 600 kg reduction in breakeven weight.

This indicates the costs are likely to outweigh the benefits of water recovery for this flowsheet. Two factors that will detract further from the benefit have not been analyzed. These include:

Drag associated with drawing in cooling air for the condenser. Assuming ram air is drawn in at −29.6° C. and 0.279 atm and exits the condenser at +5° C., the flow of compressed ram air required is 52,603 scfm (16488 scfm (ref 0° C.)). This is about a factor of 9 greater flow than is being drawn in to supply the SOFCPU. Assuming the ram compression is the only driving force for air movement (no forced air fans) the power involved in the adiabatic ram air compression is 272 kW. The power to move the cooling air ultimately will be reflected as an increase in drag or as parasitic power if compressed with fans.

Weight of the condenser, cooling air ducting, recuperator and separator. The weight of these components was not estimated since the water condensation concept did not appear feasible prior to including their weight.

It should be noted that the rate of water recovery calculated for the flowsheet of 161 kg/h is more than is required to meet the average aircraft water needs which are estimated to be ~70 kg/h.1 It may be possible to provide a bypass such that burner gases would go directly to the expander once adequate water had been collected. Incorporating this might increase the breakeven weight since efficiency would be higher when not collecting water and an average of the two efficiencies would apply. This would not affect the system weight since it would need to be sized to provide the required power while water was being collected.

Assuring Water Quality—Water supplies on aircraft are regulated by the EPA. Some effort may be required to obtain regulatory approval to use combustion condensate as drinking water. For example, EPA regulations require "all water sources must be from a watering point water system selected in accordance with Food and Drug Administration regulations [21 CFR Part O&M plan 1240 subpart E]2. It is likely that portions of the system that are not at temperatures sufficient to sterilize would need to be configured to be flushed with disinfectant to prevent bacterial growth. In addition, some sort of water treatment would probably need to be applied after withdrawing water from the tank. Currently, water loaded into the potable water tanks is UV treated as it is loaded. If running a condenser directly to the potable water tank, treatment after withdrawal from the tank may be needed. UV water treatment systems designed to treat water after being withdrawn from the aircraft potable water tank are currently available and appear to have relatively low weight and power consumption. For example, International Water Guard offers a model IWG-A4 which is capable of treating 1 gpm and weighs in at 2.8 kg while drawing 11.2 watts power from 28V DC1. In addition to bacterial concerns, measures to prevent contamination from particles related to corrosion or attrition within the SOFCPU may be needed. An examination of whether fine particulate associated with semivolatile compounds within the power system might affect water quality would be required. If strictly particulate, filters suitable for aircraft use are available. For example, Pall Corporation has qualified a point of use filter for use on the Airbus A380.2 More elaborate measures may be needed if contaminants are found that dissolve in the condensate.

The design of the current system assumes that sulfur free fuel is loaded onto the aircraft into a dedicated SOFCPU fuel tank. The fuel loaded may be a synthetic fuel produced through a Fischer-Tropsch reaction which results in an essentially zero sulfur fuel or may be an extremely low sulfur fuel produced by desulfurization of jet fuel. Fischer-Tropsh fuels are likely to become more available in the future. Shell recently began operating a 140,000 barrel/day production facility in Qatar producing a variety of products including aviation jet fuel. Petroleum based jet fuel could be desulfurized either at the airport or at a refinery and then provided to the airport as a separate fuel stream. In any case, all these options require that a separate fuel stream be handled and loaded onto the aircraft. The operation of the aircraft would be simpler if the SOFCPU could utilize the same fuel as the jet engines. To do this, the desulfurization would need to be handled on-board.

Sulfur contamination in the fuel impacts two areas of the system. In the reformer, the activity for reforming is reduced and the potential for carbon formation is increased. For the steam reforming catalyst selected, maintaining sulfur in the fuel feed below ~0.1 ppm by weight should avoid adverse effects. As poisoning occurs it may be detected by the temperature profile within the reformer. If insufficient activity remains in the reformer, unreformed jet fuel will be passed to the fuel cell resulting in hydrocarbon cracking and carbon formation in the fuel cell anode.

In the SOFC, if the anode is poisoned by sulfur the power density of the stack at a given voltage is reduced. Sulfur present in the anode feed significantly impacts the output from the SOFC. To prevent this drop in power density, an adsorbent such as ZnO would be used to scavenge sulfur in the form of H2S at the reformer outlet even if desulfurized fuel enters the reformer in order to protect the anode from any residual sulfur contamination.

A very rough estimate of the system mass to perform desulfurization on board can be made based on comparison to a system developed at PNNL to desulfurize military JP8 fuel to ~0.1 ppmw to allow steam reforming of the fuel. The sulfur specifications for JP-8, Jet A and Jet A-1 are all 3000 ppmw. However, most jet fuels are much lower than the limit, typically in the range of 500 to 1000 ppmw.

Figure 8:
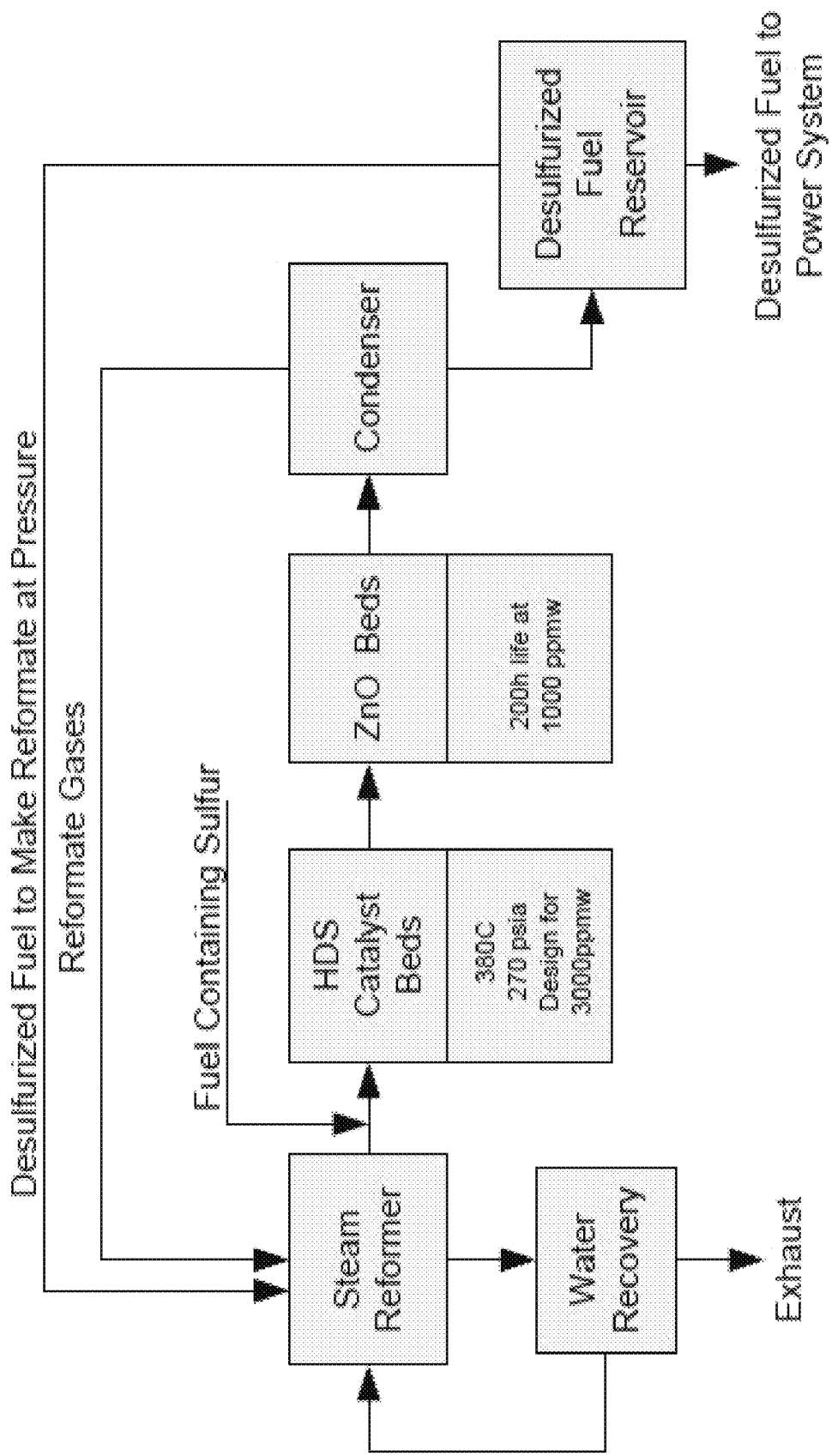
FIG. 8 is a flow diagram of a fuel desulfurization system.

An example of a layout of a desulfurization system is shown in FIG. 8. Water and desulfurized fuel is pumped up to pressure, vaporized and reacted in the steam reformer to produce a reformate stream. Sulfur containing fuel is vaporized and added to the reformate stream and introduced to the HDS catalyst bed where the organic sulfur is converted to H2S. The gaseous fuel and reformate then pass through a ZnO bed where H2S is adsorbed. The fuel is then condensed and the liquid fuel stored in a clean fuel reservoir until it is needed. The reformate gases which do not condense are then used as combustion fuel to supply the reformer.

The major weight impact of the system is associated with the HDS catalyst and ZnO beds. To arrive at an estimate, scaling of a 10 kWe system was applied1. The HDS catalyst is sized to provide desulfurization of 3000 ppmw fuel while the ZnO bed is sized to provide 200 hours when operating on 1000 ppmw jet fuel. The weight of a 6-inch diameter schedule 10 shell is calculated to contain the beds and then 50% is added to account for the reformer, insulation and other items.

Including the desulfurization system would increase the system mass by about 35%. In addition to the added mass of the desulfurization system there would be some loss of efficiency associated with the use of fuel to make reformate to drive the desulfurization. This reduction in efficiency would reduce the breakeven weight by several hundred kg making it more difficult to save fuel on-board the aircraft. On the other hand, a requirement to provide desulfurized fuel to the aircraft may result in the aircraft carrying desulfurized fuel for electrical generation sufficient to cover multiple legs of a trip if intermediate airports do not have a supply of desulfurized fuel.

Performing desulfurization on-board the aircraft will make the overall system less reliable. When desulfurized fuel is produced on the ground, it is possible to analyze a large blended tank of fuel to confirm the desulfurization effectiveness prior to loading onto an aircraft. With desulfurization on-board, any problems with the desulfurization operation become a failure mode for the power generation system.

In view of the many possible embodiments to which the principles of the disclosed invention may be applied, it should be recognized that the illustrated embodiments are only preferred examples of the invention and should not be taken as limiting the scope of the invention.

What is claimed is:

1. A system comprising:
   a solid oxide fuel cell having an anode gas inlet, an anode gas outlet, a cathode gas inlet, and a cathode gas outlet;
   an adiabatic steam reformer fluidly coupled to the anode gas outlet, the anode gas inlet, and to a fuel supply, the adiabatic steam reformer being directly coupled from the anode gas outlet;
   a heat recuperator fluidly coupled to the cathode gas outlet;
   a combustor fluidly coupled to the cathode gas outlet of the heat recuperator;
   a first conduit fluidly coupled from the anode gas outlet to the adiabatic steam reformer thereby forming an anode recycle loop; and
   a second conduit directly leading from the first conduit to the combustor such that the combustor is also fluidly coupled to the anode gas outlet,
   wherein the adiabatic steam reformer does not include means for introducing steam into the reformer except via the anode recycle loop, the anode recycle loop does not include any separation means for removing water or $CO_2$, and the adiabatic steam reformer is not fluidly coupled to the cathode gas outlet; and
   wherein the system does not include another combustor separate from the combustor fluidly coupled to the cathode gas outlet of the heat recuperator.

2. The system of claim 1, wherein a combusted gas outlet of the combustor is fluidly coupled to an expander, the expander is coupled to a compressor, and the compressor has an air inlet and a compressed air outlet fluidly coupled to the cathode gas inlet.

3. The system of claim 2, wherein the heat recuperator has a first flow path in fluid communication between the cathode gas outlet and the combustor, and a second flow path in fluid communication between the compressed air outlet and the cathode gas inlet.

4. The system of claim 1, wherein the combustor is configured for combusting anode exhaust gas and cathode exhaust gas.

5. The system of claim 1, wherein the system is configured such that 80% to 95% of the gas exiting the anode gas outlet is introduced into the adiabatic steam reformer via the anode recycle loop.

6. The system of claim 1, wherein the system is configured such at least 90% of the gas exiting the anode gas outlet is introduced into the adiabatic steam reformer via the anode recycle loop.

7. An electrical generation system comprising the system of claim 1.

8. The system of claim 7, wherein the system is an on-board electrical generation system for an aircraft.

9. The system of claim 7, wherein the system includes:
   a plurality of solid oxide fuel cells arranged in a plurality of solid oxide fuel cell stacks along an axial direction;
   and a plurality of adiabatic steam reformers arranged in the same axial direction,
   wherein each individual adiabatic steam reformer is positioned adjacent to the solid oxide fuel cell stacks along the axial direction.

10. The system of claim 9, wherein each individual adiabatic steam reformer is positioned to form a line parallel to the line formed by the individual fuel cell stacks arranged in a row along the axial direction.

11. The system of claim 9, wherein the fuel cell stacks and the adiabatic steam reformers are housed within an insulated pressure vessel.

* * * * *

UNITED STATES PATENT AND TRADEMARK OFFICE
CERTIFICATE OF CORRECTION

PATENT NO.         : 10,622,653 B2
APPLICATION NO.    : 14/210228
DATED              : April 14, 2020
INVENTOR(S)        : Greg A. Whyatt and Lawrence A. Chick It is certified that error appears in the above-identified patent and that said Letters Patent is hereby corrected as shown below:

In the Specification

Please add the following first paragraph:
Statement Related to Federally Sponsored Research and Development
This invention was made with government support under DE-FC26-02NT41246 awarded by the U.S. Department of Energy. The government has certain rights in the invention.

Signed and Sealed this
Fifth Day of November, 2024

Katherine Kelly Vidal
*Director of the United States Patent and Trademark Office*